United States Patent
Kim et al.

(10) Patent No.: US 12,294,574 B2
(45) Date of Patent: May 6, 2025

(54) HOME APPLIANCE AND OPERATING METHOD THEREOF

(71) Applicant: Samsung Electronics Co., Ltd., Suwon-si (KR)

(72) Inventors: Hyunsoo Kim, Suwon-si (KR); Jungwoo Choi, Suwon-si (KR); Kihoon Nam, Suwon-si (KR); Dongwan Kang, Suwon-si (KR); Sangkoo Kim, Suwon-si (KR); Donghoo Park, Suwon-si (KR); Jooseok Park, Suwon-si (KR); Jeonghyo Sohn, Suwon-si (KR); Kanghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 390 days.

(21) Appl. No.: 17/841,242

(22) Filed: Jun. 15, 2022

(65) Prior Publication Data

US 2023/0035368 A1 Feb. 2, 2023

Related U.S. Application Data

(63) Continuation of application No. PCT/KR2022/006277, filed on May 2, 2022.

(30) Foreign Application Priority Data

Jul. 30, 2021 (KR) .................. 10-2021-0101026

(51) Int. Cl.
*H04L 9/40* (2022.01)
*H04L 12/28* (2006.01)

(52) U.S. Cl.
CPC ...... *H04L 63/0846* (2013.01); *H04L 12/2803* (2013.01); *H04L 2012/285* (2013.01)

(58) Field of Classification Search
CPC ............ H04L 63/0846; H04L 12/2803; H04L 2012/285; H04L 9/40; H04L 12/28;
(Continued)

(56) References Cited

U.S. PATENT DOCUMENTS 6,119,227 A * 9/2000 Mao .................. G06Q 20/3825
380/278
9,992,677 B2 6/2018 Kim et al.
(Continued)

FOREIGN PATENT DOCUMENTS

KR 2002-0046058 A 6/2002
KR 10-0724351 B1 6/2007
(Continued)

OTHER PUBLICATIONS

Office Action dated Jun. 13, 2024, issued in European Application No. EP 22 84 9676.
(Continued)

*Primary Examiner* — John B King
(74) *Attorney, Agent, or Firm* — STAAS & HALSEY LLP

(57) ABSTRACT

Provided are a method of registering a home appliance in an Internet-of-Things (IoT) server, and a home appliance. The home appliance performs device registration by obtaining access point information and information of a set-up cloud server from a mobile device connected through device-to-device communication, transmitting a temporary password to the mobile device through the device-to-device communication, establishing a communication connection with the set-up cloud server by using the obtained access point information and the obtained information of the set-up cloud server, obtaining user account information from the set-up cloud server by using the temporary password as an iden-
(Continued)

tification key, and providing information of the home appliance and the user account information to an IoT server.

15 Claims, 13 Drawing Sheets

(58) Field of Classification Search
CPC . H04L 67/12; H04L 12/2807; H04L 12/2834; H04L 63/083; H04W 12/06; H04W 12/61
See application file for complete search history.

(56) References Cited

U.S. PATENT DOCUMENTS

| | | | |
|---|---|---|---|
| 10,448,211 B1* | 10/2019 | Shen | G06K 7/10366 |
| 10,705,494 B2 | 7/2020 | Ha | |
| 10,742,742 B2 | 8/2020 | Han et al. | |
| 10,904,028 B2 | 1/2021 | Jang et al. | |
| 10,911,448 B2 | 2/2021 | Ha et al. | |
| 11,133,944 B2 | 9/2021 | Yang et al. | |
| 11,689,385 B2 | 6/2023 | Hwang et al. | |
| 12,149,406 B2* | 11/2024 | Johnson | H04L 67/125 |
| 2001/0044896 A1* | 11/2001 | Schwartz | H04L 63/12 |
| | | | 713/169 |
| 2014/0173082 A1* | 6/2014 | Shin | H04L 67/06 |
| | | | 709/223 |
| 2014/0244568 A1* | 8/2014 | Goel | H04L 67/12 |
| | | | 706/46 |
| 2015/0043426 A1* | 2/2015 | Aggarwal | H04W 52/04 |
| | | | 370/328 |
| 2015/0222621 A1* | 8/2015 | Baum | H04L 63/0807 |
| | | | 726/9 |
| 2015/0249672 A1* | 9/2015 | Burns | G06F 21/629 |
| | | | 726/4 |
| 2016/0112980 A1* | 4/2016 | Pai | H04L 63/205 |
| | | | 455/435.1 |
| 2016/0173450 A1* | 6/2016 | Mircescu | H04L 63/02 |
| | | | 726/14 |
| 2016/0197786 A1* | 7/2016 | Britt | H04L 12/2807 |
| | | | 370/255 |
| 2017/0134378 A1* | 5/2017 | Corcoran | H04L 9/3218 |
| 2017/0178175 A1* | 6/2017 | Dhaliwal | G08B 27/003 |
| 2018/0082093 A1* | 3/2018 | Crooks | G06F 11/3068 |
| 2018/0199683 A1* | 7/2018 | Gharabegian | E04H 15/28 |
| 2018/0227128 A1* | 8/2018 | Church | H04L 9/3247 |
| 2019/0043281 A1* | 2/2019 | Aman | G07C 9/215 |
| 2019/0158353 A1* | 5/2019 | Johnson | H04L 67/125 |
| 2019/0364036 A1* | 11/2019 | Simpson | H04W 4/60 |
| 2020/0036727 A1* | 1/2020 | Pegg | H04L 63/0876 |
| 2020/0059976 A1* | 2/2020 | Bhatia | H04W 8/005 |
| 2020/0127896 A1* | 4/2020 | Davito | H04L 67/125 |
| 2021/0033697 A1* | 2/2021 | Vyunova | G01S 5/02527 |
| 2021/0051479 A1* | 2/2021 | Karkhanis | H04W 48/20 |
| 2021/0295993 A1 | 9/2021 | Shin | |
| 2022/0101992 A1* | 3/2022 | Porter | A61B 5/01 |

FOREIGN PATENT DOCUMENTS

| | | |
|---|---|---|
| KR | 10-1276861 B1 | 6/2013 |
| KR | 10-2014-0078518 | 6/2014 |
| KR | 10-2015-0072308 | 6/2015 |
| KR | 10-1643870 | 8/2016 |
| KR | 10-2016-0149751 | 12/2016 |
| KR | 10-1762013 | 7/2017 |
| KR | 10-1980039 B1 | 5/2019 |
| KR | 10-2026696 B1 | 9/2019 |
| KR | 10-2072725 | 2/2020 |
| KR | 10-2020-0079674 | 7/2020 |
| KR | 10-2210748 | 2/2021 |
| KR | 10-2218295 B1 | 2/2021 |
| KR | 10-2418668 | 7/2022 |

OTHER PUBLICATIONS

International Search Report and Written Opinion dated Jul. 28, 2022, issued in International Application No. PCT/KR2022/006277.

Office Action dated Mar. 17, 2025, in European Application No. 22 849 676.6.

* cited by examiner

HOME APPLIANCE AND OPERATING METHOD THEREOF

CROSS-REFERENCE TO RELATED APPLICATIONS

This application is a continuation application under 35 U.S.C. § 111(a) of International Application No. PCT/KR2022/006277, filed on May 2, 2022, it being further noted that foreign priority benefit is based upon Korean Patent Application No. 10-2021-0101026, filed on Jul. 30, 2021, in the Korean Intellectual Property Office, the disclosures of which are incorporated by reference herein in their entireties.

BACKGROUND

1. Field

The disclosure relates to a home appliance and an operating method thereof. More particularly, embodiments of the disclosure relate to a method of registering a home appliance in an Internet-of-Things (IoT) server by using a mobile device and a set-up cloud server connected to each other through a communication network.

2. Description of Related Art

With the widespread use of Internet-of-Things (IoT) products, people's lives are getting better than before, as things around them are connected to the Internet. Recently, home appliances including a wireless fidelity (Wi-Fi) module or a Bluetooth module that can be connected to the Internet have been widely distributed and used. In order to control a home appliance by using a communication network, the home appliance should transmit state information only to a user (owner), and the user should transmit a control command only to the home appliance that the user is using. Therefore, in order to monitor the state of the home appliance in real time and control the home appliance, a process of registering the home appliance in an IoT server is essential.

Mobile devices such as smart phones or smart TVs include processors and displays, and thus user account information may be directly input when registering the device in an IoT server. However, because a general home appliance does not include a processor or a display, there is a limitation in a method of inputting user account information when the home appliance is registered in the IoT server. This limitation can be solved by using a mobile device such as a smart phone. Particularly, a method in which a smart phone mediates a process of connecting a home appliance to the Internet and a process of registering the home appliance in an IoT server may be utilized. This scheme is referred to as 'Easy Setup', 'onboarding', or 'commissioning'.

SUMMARY

Additional aspects will be set forth in part in the description which follows and, in part, will be apparent from the description, or may be learned by practice of the presented embodiments.

According to an embodiment of the disclosure, a method may include, by a home appliance, obtaining access point information and information of a set-up cloud server, from a mobile device connected to the home appliance through device-to-device communication, transmitting a temporary password to the mobile device through the device-to-device communication, establishing a communication connection with the set-up cloud server by using the obtained access point information and the obtained information of the set-up cloud server, obtaining user account information from the set-up cloud server by using the temporary password as an identification key, and registering the home appliance in an Internet-of-Things (IoT) server by providing information of the home appliance and the obtained user account information to the IoT server.

In an embodiment of the disclosure, the temporary password may be a one-time password (OTP).

In an embodiment of the disclosure, the temporary password may consist of an arbitrarily generated random number and at least one of characters, numbers, or a combination thereof, which indicate device identification information.

In an embodiment of the disclosure, the user account information may be obtained from the set-up cloud server based on a mapping of the user account information with the temporary password in a key-value format in the set-up cloud server.

In an embodiment of the disclosure, the obtaining of the user account information may include transmitting, to the set-up cloud server through the communication connection with the set-up cloud server, the temporary password and a query signal for requesting the user account information, and obtaining, from the set-up cloud server, the user account information based on a mapping of the user account information with the temporary password in a key-value format in the set-up cloud server.

In an embodiment of the disclosure, the method may further include, by the home appliance, receiving, from the mobile device, a user authentication process request signal for requesting an authentication process with respect to ownership of the home appliance, receiving an authentication input from a user in response to the received user authentication process request signal, and transmitting information about the authentication input to the mobile device.

In an embodiment of the disclosure, in the transmitting of the temporary password, the temporary password may be transmitted to the mobile device according to a result of a user authentication by the mobile device based on the transmitted information about the authentication input.

In an embodiment of the disclosure, the obtaining of the user account information may include obtaining, from the set-up cloud server, server connection information including at least one of an internet protocol (IP) address of the IoT server, an access token of the IoT server, a location identifier (ID) of the home appliance, a room ID, a nickname, or an access point name (APN).

In an embodiment of the disclosure, the registering of the home appliance may include establishing a communication connection with the IoT server by using the server connection information, signing in to the IoT server by using the user account information, and registering the home appliance with the user account by transmitting at least one of device identification information, a device type, resource information, or profile information of the home appliance.

According to an embodiment of the disclosure, a home appliance may include a communication interface configured to perform data communication with a server or a mobile device, a memory storing at least one instruction, and at least one processor configured to execute the at least one instruction stored in the memory to obtain access point information and information of a set-up cloud server from the mobile device connected to the home appliance through device-to-device communication, by using the communication interface, generate a temporary password comprising a random number, transmit the temporary password to the mobile device by using the communication interface, establish a communication connection with the set-up cloud server by using the obtained access point information and the obtained information of the set-up cloud server, obtain user account information from the set-up cloud server by using the temporary password as an identification key, and perform device registration in an Internet-of-Things (IoT) server by providing information of the home appliance and the obtained user account information to the IoT server.

In an embodiment of the disclosure, the temporary password may be a one-time password (OTP).

In an embodiment of the disclosure, the temporary password may consist of an arbitrarily generated random number and at least one of characters, numbers, or a combination thereof, which indicate device identification information.

In an embodiment of the disclosure, the user account information may include a user identifier (ID) and a password.

In an embodiment of the disclosure, the user account information may be obtained from the set-up cloud server based on a mapping of the user account information with the temporary password in a key-value format in the set-up cloud server.

In an embodiment of the disclosure, the at least one processor may be further configured to execute the at least one instruction to control the communication interface to transmit, to the set-up cloud server, the temporary password and a query signal for requesting the user account information, and obtain the user account information based on a mapping of the user account information with the temporary password in a key-value format in the set-up cloud server.

In an embodiment of the disclosure, the home appliance may further include a user input unit, and the at least one processor may be further configured to execute the at least one instruction to receive, from the mobile device through the communication interface, a user authentication process request signal for requesting an authentication process with respect to ownership of the home appliance, receive an authentication input from a user through the user input unit in response to the received user authentication process request signal, and control the communication interface to transmit, to the mobile device, information about the authentication input.

In an embodiment of the disclosure, the at least one processor may be further configured to execute the at least one instruction to control the communication interface to transmit the temporary password to the mobile device according to a result of a user authentication by the mobile device based on the transmitted information about the authentication input.

In an embodiment of the disclosure, the at least one processor may be further configured to execute the at least one instruction to control the communication interface to obtain, from the set-up cloud server, server connection information including at least one of an internet protocol (IP) address of the IoT server, an access token of the IoT server, a location ID of the home appliance, a room ID, a nickname, and an access point name (APN).

In an embodiment of the disclosure, the at least one processor may be further configured to execute the at least one instruction to establish a communication connection with the IoT server by using the server connection information, sign in to the IoT server by using the user account information, control the communication interface to transmit at least one of device identification information, a device type, resource information, or profile information of the home appliance, and register the home appliance in the IoT server in association with the user account information.

According to an embodiment of the disclosure, provided is a computer program product including a non-transitory computer-readable storage medium having recorded thereon instructions executable by a home appliance for performing a method disclosed herein.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
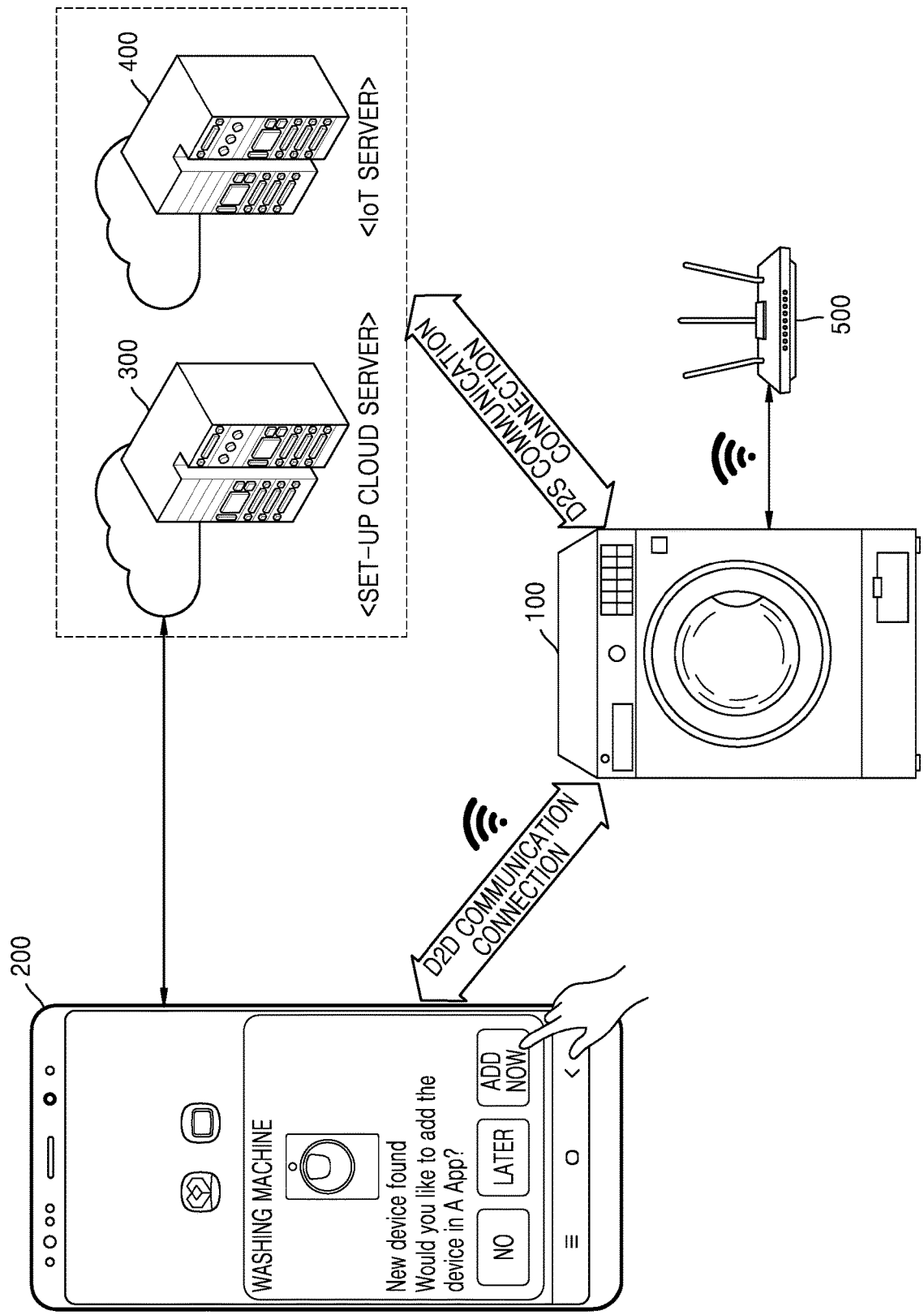
FIG. 1 is a conceptual diagram illustrating a method, performed by a home appliance, of performing device registration in an Internet-of-Things (IoT) server by using a device-to-device communication connection with a mobile device and a device-to-server communication connection with a server, according to an embodiment of the disclosure.

Throughout the disclosure, the expression "at least one of a, b or c" indicates only a, only b, only c, both a and b, both a and c, both b and c, all of a, b, and c, or variations thereof.

Although the terms used in the disclosure are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used in the disclosure are not merely designations of the terms, but the terms are defined based on the meaning of the terms and content throughout the disclosure.

The singular expression also includes the plural meaning as long as it does not inconsistent with the context. Unless otherwise defined, all terms, including technical and scientific terms, used herein may have the same meaning as commonly understood by one of skill in the art to which the disclosure pertains based on an understanding of the disclosure.

Throughout the disclosure, when an element "includes" an element, unless there is a particular description contrary thereto, the element may further include other elements, not excluding the other elements. Also, the terms described in the specification, such as " . . . er (or)", " . . . unit", etc., denote a unit that performs at least one function or operation, which may be implemented as hardware or software or a combination thereof.

The expression "configured to" used in the specification may be exchanged with, for example, "suitable for", "having the capacity to", "designed to", "adapted to", "made to", or "capable of" in accordance with circumstances. The term "configured to" does not necessarily indicate only "specifically designed to" in terms of hardware. Instead, in a certain circumstance, the expression "a system configured to" may indicate the system "capable of" together with another device or components. For example, "a processor configured to perform A, B, and C" may indicate an exclusive processor (e.g., an embedded processor) configured to perform a corresponding operation or a generic-purpose processor (e.g., a central processing unit (CPU) or an application processor) capable of performing corresponding operations by executing one or more software programs stored in a memory.

In the disclosure, it should be understood that when elements are "connected" or "coupled" to each other, the elements may be directly connected or coupled to each other, but may alternatively be connected or coupled to each other with an intervening element therebetween, unless specified otherwise.

A 'set-up cloud server' used herein is a server for providing user account information to a home appliance for Easy Setup, which is a process for registering a home appliance in an Internet-of-Things (IoT) server by using a mobile device. The set-up cloud server maps the user account information with a temporary password and stores the user account information. In an embodiment of the disclosure, the set-up cloud server may store, in a key-value format, the temporary password as a key and the mapped user account information as a value. The set-up cloud server may be a server separate from the IoT server, but is not limited thereto. In an embodiment of the disclosure, the set-up cloud server may be a module included in the IoT server.

The 'IoT server' used herein is a server for registering a device (e.g., a mobile device or a home appliance) connected to a communication network, according to user account information. The IoT server may store information of a device which is registered in association with a user account. The IoT server may store, for example, at least one of an identification value (e.g., a device ID) of the device, a type of the device, resource information related to functional capability information of the device, or profile information. In an embodiment of the disclosure, the IoT server may store a control command for controlling a registered device to execute a certain function and/or operation.

Hereinafter, embodiments of the disclosure will be described in detail with reference to the accompanying drawings such that those of skill in the art may easily carry out the disclosure. The disclosure may, however, be embodied in many different forms and should not be construed as being limited to the embodiments of the disclosure set forth herein.

The disclosure provides a home appliance and an operating method thereof. Particularly, an embodiment of the disclosure relates to a method, performed by a home appliance in a new product state, which is not registered in an Internet-of-Things (IoT) server, of obtaining user account information from a set-up cloud server by using a temporary password as an identification key and performing device registration in the IoT server by using the obtained user account information, and a device for performing the method.

Hereinafter, embodiments of the disclosure will be described in detail with reference to the drawings.

FIG. 1 is a conceptual diagram illustrating a method, performed by a home appliance 100, of performing device registration in an IoT server 400 through a device-to-device communication connection with a mobile device 200 and a device-to-server communication connection with a set-up cloud server 300 and the IoT server 400, according to an embodiment of the disclosure.

Referring to FIG. 1, the home appliance 100 may provide various functions while communicating with the mobile device 200, the set-up cloud server 300, and the IoT server 400. The home appliance 100 may be, for example, any one of a washing machine, a refrigerator, a Kimchi refrigerator, a TV, an air conditioner, an air purifier, a cleaning robot, a vacuum cleaner, a clothing care system, an oven, a microwave oven, an induction range, an audio output device, or a smart home hub device.

The home appliance 100 may access the set-up cloud server 300 and the IoT server 400 and may be registered in the IoT server 400. Also, the home appliance 100 may provide various functions through an application which is executed by the mobile device 200. The application may operate in association with the IoT server 400. The application may provide functions of monitoring, control, automation, voice assistant, and the like of the home appliance 100.

In order to provide such application functions, the home appliance 100 needs to be registered in the mobile device 200 and the IoT server 400 and be communicatively connected to the mobile device 200 and the IoT server 400. The home appliance 100 in a new product state, i.e., in a state in which the home appliance 100 is not yet registered in the IoT server 400 after being shipped at a factory, is unable to perform the functions of the application and various functions and/or operations provided by the IoT server 400. This new product state is referred to as an out-of-box (OOB) state.

The term 'new product state' used herein refers to a state in which the home appliance 100 is not registered in the IoT server 400. The home appliance 100 is registered in the IoT server 400 in association with a certain user account. The home appliance 100 may be managed as a device of the certain user account, and may be monitored and controlled by another device logged in with the user account associated with the home appliance 100. The home appliance 100, which is not registered in the IoT server 400, may generate and output information indicating that the home appliance 100 is in the new product state and needs to be registered in the IoT server 400.

The home appliance 100 in the new product state may establish a device-to-device (D2D) communication connection with the mobile device 200, and then establish a device-to-server (D2S) communication connection with the set-up cloud server 300 and the IoT server 400.

In an embodiment of the disclosure, the home appliance 100 may utilize software-enabled access point (SoftAP) that enables the home appliance 100 to be recognized as a virtual access point (AP) for a communication connection. The 'SoftAP' is implemented as software that is a wireless local area network (LAN) client but also serves as a wireless AP. The SoftAP may operate in the same manner as does a wireless AP. In an embodiment of the disclosure, the home appliance 100 executes the SoftAP by using a wireless fidelity (Wi-Fi) module. The mobile device 200 may establish a Wi-Fi communication connection with the home appliance 100 and perform Wi-Fi communication with the home appliance 100, by accessing the SoftAP of the home appliance 100. The Wi-Fi communication connection established between the mobile device 200 and the home appliance 100 by using the SoftAP may be performed through a Wi-Fi Direct scheme.

The home appliance 100 may receive information of a home AP 500 and information of the set-up cloud server 300 from the mobile device 200 through the D2D communication connection. The home AP 500 is a device for connecting wireless devices to a wired communication cable so as to enable data communication. The home AP 500 may include a router connected to a wired communication network and a wireless communication module for a wireless communication network. In an embodiment of the disclosure, the home appliance 100 may receive, from the mobile device 200, a service set identifier (SSID) and password information of the home AP 500. The home appliance 100 may also receive information about an encryption type of the home AP 500. Also, the home appliance 100 may receive, from the mobile device 200, internet protocol (IP) address information of the set-up cloud server 300.

According to an embodiment of the disclosure, the home appliance 100 obtains user account information from the set-up cloud server 300, instead of receiving the user account information from the mobile device 200 through the D2D communication connection. The mobile device 200 may transmit the user account information to the set-up cloud server 300. Also, the home appliance 100 receives, from the set-up cloud server 300, the user account information transmitted from the mobile device 200.

The home appliance 100 may establish the D2S communication connection with the set-up cloud server 300 by using the received information of the home AP 500 and the received IP address information of the set-up cloud server 300. The home appliance 100 may perform the D2S communication connection by using, for example, a wired LAN, a wireless LAN, Wi-Fi, Wireless Broadband Internet (Wi-Bro), Worldwide Interoperability for Microwave Access (WiMAX), Wireless Gigabit Alliance (WiGig), a legacy cellular network (e.g., third generation (3G) or Long-Term Evolution (LTE)), a fifth-generation (5G) network, or the like.

The home appliance 100 may obtain the user account information from the set-up cloud server 300 through the D2S communication connection. In an embodiment of the disclosure, the home appliance 100 may obtain the user account information from the set-up cloud server 300 by using a temporary password as an identification key. A method, performed by the home appliance 100, of obtaining the user account information from the set-up cloud server 300 by using the temporary password will be described in detail with reference to FIGS. 5 and 6.

The home appliance 100 may receive server connection information from the set-up cloud server 300, and may establish the D2S communication connection with the IoT server 400 by using the server connection information. Here, the 'server connection information' may include, for example, at least one of an IP address of the IoT server 400, an access token of the IoT server 400, a location identifier (ID) of the home appliance 100, a room ID, a nickname, or an AP name (APN). The home appliance 100 may access (e.g., sign in to) the IoT server 400 by using the server connection information, and perform device registration in association with the user account information. The home appliance 100 may be associated with a certain user account of the IoT server 400 through a device registration process.

As a comparative example, in the related art, in order to register the home appliance 100 in the IoT server 400, the home appliance 100 uses a method of obtaining the information of the home AP 500, the server connection information of the IoT server 400, and the user account information, from the mobile device 200 through the D2D communication connection, and performing device registration in the IoT server 400 through a D2S connection by using the obtained information of the AP 500, the obtained server connection information, and the obtained user account information. However, because the D2D communication connection performs data communication by using a user datagram protocol (UDP) scheme, the data packet loss rate is higher than that of the D2S communication connection using a transmission control protocol (TCP) scheme. That is, in the existing scheme, the user account information is transmitted by using the UDP scheme, the user account information is highly likely to be lost in a communication process as compared with the TCP scheme.

In the device registration process of registering the home appliance in the IoT server 400, the home appliance 100 according to an embodiment of the disclosure receives the user account information from the set-up cloud server 300 through the D2S communication connection, instead of receiving the user account information from the mobile device 200 through the D2D communication connection, thereby reducing the loss rate of the user account information. In addition, the home appliance 100 according to an embodiment of the disclosure uses the temporary password as the identification key when receiving the user account information from the set-up cloud server 300, and thus may verify and prevent registration of the home appliance performed by another user. Accordingly, the home appliance 100 of the disclosure provides a technical effect of enhancing the security in the process of registering the device in the IoT server 400.

Figure 2:
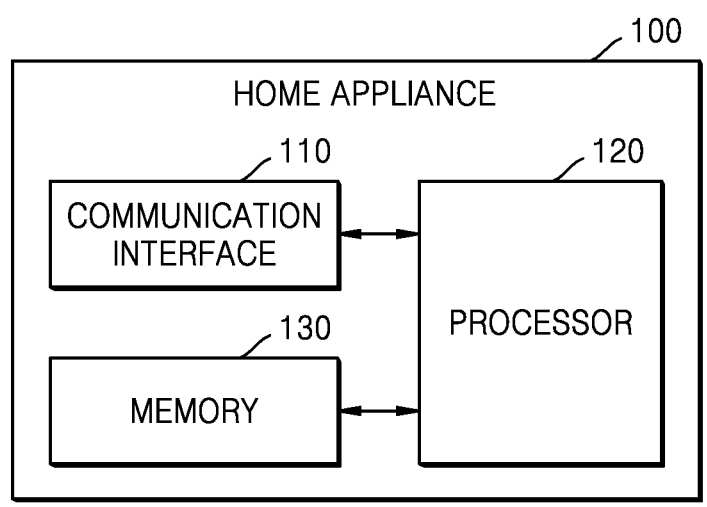
FIG. 2 is a block diagram illustrating components of a home appliance, according to an embodiment of the disclosure.

FIG. 2 is a block diagram illustrating components of the home appliance 100 according to an embodiment of the disclosure.

The home appliance 100 is an electronic device that performs a preset function or operation. The home appliance 100 is at a certain location in the home. The home appliance 100 may include, for example, a washing machine, a refrigerator, a Kimchi refrigerator, a TV, an air conditioner, an air purifier, a cleaning robot, a vacuum cleaner, a clothing care system, an oven, a microwave oven, an induction range, an audio output device, a smart home hub device, and the like.

Referring to FIG. 2, the home appliance 100 may include a communication interface 110, a processor 120, and a memory 130. The communication interface 110, the processor 120, and the memory 130 may be electrically and/or physically connected to each other.

The components illustrated in FIG. 2 are only those according to an embodiment of the disclosure, and the components included in the home appliance 100 are not limited to those illustrated in FIG. 2. The home appliance 100 may not include some of the components illustrated in FIG. 2, and may further include components not illustrated in FIG. 2. For example, the home appliance 100 may further include a display unit for displaying a user interface (UI) regarding a function or a UI indicating operation information. As another example, the home appliance 100 may further include a speaker for outputting a voice or sound signal.

The communication interface 110 is configured to perform data communication with an external server or the mobile device 200 (see FIG. 1) through a wired or wireless communication network.

The communication interface 110 may include a short-range wireless communication module that performs data communication with the mobile device 200 by using a short-range wireless communication scheme. The short-range wireless communication module may be configured as at least one hardware module of, for example, a Wi-Fi and Wi-Fi Direct (WFD) communication unit, a Bluetooth communication unit, a Bluetooth Low Energy (BLE) communication unit, a near-field communication (NFC) unit, a Zigbee communication unit, an Ant+ communication unit, or a microwave (μWave) communication unit, but is not limited thereto.

In an embodiment of the disclosure, the communication interface 110 may perform data communication with a server (e.g., the set-up cloud server 300 (see FIG. 1) or the IoT server 400 (see FIG. 1)) by using a long-range communication scheme. For example, the communication interface 110 may establish a D2D communication connection with the home AP 500 (see FIG. 1) through Wi-Fi or Wi-Fi direct, and may perform data communication with the set-up cloud server 300 or the IoT server 400 through a long-range communication network connected to the home AP 500. The communication interface 110 may include, in addition to the short-range wireless communication module, a wireless communication module (e.g., a legacy cellular communication module, a 5G communication module, or a global navigation satellite system (GNSS) communication module), or a wired communication module (e.g., a LAN communication module, or a power line communication module).

The processor 120 may execute one or more instructions or program code stored in the memory 130, and perform a function and/or an operation corresponding to the instructions or the program code. The processor 120 may include a hardware component for performing arithmetic operations, logic operations, input/output operations, and signal processing. For example, the processor 120 may include, for example, at least one of central processing units (CPUs), microprocessors, graphics processing units (GPUs), application processors (APs), application-specific integrated circuits (ASICs), digital signal processors (DSPs), digital signal processing devices (DSPDs), programmable logic devices (PLDs), or field programmable gate arrays (FPGAs), but is not limited thereto.

In FIG. 2, the processor 120 is illustrated as one element, but is not limited thereto. In an embodiment of the disclosure, one or more processors 120 may be provided.

In an embodiment of the disclosure, the processor 120 may include a dedicated hardware chip that performs artificial intelligence (AI) learning.

The memory 130 may store instructions and program code which are readable by the processor 120. The memory 130 may include, for example, at least one of a flash memory-type storage medium, a hard disk-type storage medium, a multimedia card micro-type storage medium, a card-type memory (e.g., an SD or XD memory), random access memory (RAM), static random-access memory (SRAM), read-only memory (ROM), electrically erasable programmable read-only memory (EEPROM), programmable read-only memory (PROM), a magnetic memory, a magnetic disc, or an optical disc.

In the following embodiments, the processor 120 may be implemented by executing instructions or program code of a program stored in the memory 130.

The processor 120 may establish the D2D communication connection with the mobile device 200 (see FIG. 1) by using the communication interface 110. For example, the processor 120 may perform a D2D communication connection with the mobile device 200 by using a Wi-Fi Direct communication scheme. In an embodiment of the disclosure, the processor 120 may perform a SoftAP operation such that the communication interface 110 operates as a SoftAP. The processor 120 may execute predefined instructions for performing the SoftAP operation, to control the communication interface 110 to operate as the SoftAP. The processor 120 may assign an SSID to the communication interface 110, and set the assigned SSID as an SSID of the SoftAP. As the mobile device 200 accesses the SoftAP through the SSID of the communication interface 110, the D2D communication connection between the home appliance 100 and the mobile device 200 may be established.

The processor 120 may obtain the information of the home AP 500 (see FIG. 1) and the information of the set-up cloud server 300 (see FIG. 1) from the mobile device 200 through the D2D communication connection. For example, the processor 120 may receive information about an SSID, a password, and an encryption type of the home AP 500. For example, the processor 120 may receive the IP address information of the set-up cloud server 300.

The processor 120 may transmit, to the mobile device 200 through the D2D communication connection, device information including at least one of device identification information (e.g., a device ID), a device type, ownership state information, or operation state information.

The processor 120 does not receive user account information from the mobile device 200 through the D2D communication connection. The processor 120 may generate a temporary password to obtain the user account information. In an embodiment of the disclosure, the processor 120 may generate the temporary password by using an arbitrarily generated random number and at least one of characters, numbers, which indicate device identification information (e.g., a device ID), or a combination thereof. The temporary password may be, for example, a one-time password (OTP). The processor 120 may transmit the temporary password to the mobile device 200 through the D2D communication connection.

The processor 120 may control the communication interface 110 to perform a communication connection with the set-up cloud server 300 by using the obtained information of the home AP 500 and the obtained information of the set-up cloud server 300. In an embodiment of the disclosure, by using the SSID and the password of the home AP 500, and the IP address information of the set-up cloud server 300, the processor 120 may access the set-up cloud server 300, and establish the D2S communication connection with the set-up cloud server 300.

The processor 120 may obtain the user account information from the set-up cloud server 300 by using the temporary password as an identification key. In an embodiment of the disclosure, the processor 120 may transmit, to the set-up cloud server 300 through the communication interface 110, a query signal for requesting user account information mapped to the temporary password. The processor 120 may transmit the query signal together with the temporary password to the set-up cloud server 300.

The set-up cloud server 300 may store at least one user account mapped to at least one temporary password. In an embodiment of the disclosure, the set-up cloud server 300 may include a user account database 330 (see FIG. 6) that maps and stores a plurality of temporary passwords with a plurality of pieces of user account information, in a key-value format. The user account database 330 will be described in detail with reference to FIG. 6.

The processor 120 may obtain, from the set-up cloud server 300 through the communication interface 110, user account information mapped to a temporary password in a key-value format. The user account information may include, for example, a user ID and password information. Here, the 'user ID' may be an ID, an email address, or an identification value of the email address, which is set by a user.

In an embodiment of the disclosure, the processor 120 may receive, from the set-up cloud server 300 through the communication interface 110, server connection information for accessing the IoT server 400. The processor 120 may receive the server connection information including, for example, at least one of an IP address of the IoT server 400, an access token of the IoT server 400, a location ID of the home appliance 100, a room ID, a nickname, or an APN.

The processor 120 may control the communication interface 110 to establish the D2S communication connection with the IoT server 400 by using the server connection information. The processor 120 may sign in to the IoT server 400 by using the user account information. The processor 120 may register the home appliance 100 in a user account by transmitting at least one of device identification information, a device type, resource information, or profile information of the home appliance 100 through the D2S communication connection. Here, the 'resource information' may be, for example, information about power supply, a mode (e.g., a standard mode, a blanket mode, a towel mode, or the like when the home appliance 100 is a washing machine, or a cooling function, a dehumidifying mode, a wind-free mode, or the like when the home appliance 100 is an air conditioner), and a function of the home appliance 100. The 'profile information' may be information about at least one of a firmware version, an application version, or an Easy Setup version of the home appliance 100.

In an embodiment of the disclosure, the processor 120 may receive, from the mobile device 200 through the communication interface 110, a user authentication request signal for requesting authentication of the ownership of the home appliance 100. As the user authentication request signal is received, the processor 120 may receive an authentication input from the user. In an embodiment of the disclosure, the home appliance 100 may further include a user input unit for receiving a user authentication input. When a user authentication input request signal for authenticating whether the home appliance 100 is owned is received from the mobile device 200 (see FIG. 1), the user input unit may receive a user authentication input under the control by the processor 120. The user input unit may be configured as hardware such as a button, a switch, a jog switch, or a touch pad. However, the disclosure is not limited thereto, and the user input unit may be configured as a touch screen configured to receive a touch input and display a graphical user interface (GUI).

The 'authentication input' refers to an input for authenticating that the user who intends to register the home appliance 100 in the IoT server 400 is a genuine owner of the home appliance 100. The authentication input may be, for example, an input of pressing a button of the home appliance 100 or a touch input on a touch pad, but is not limited thereto. For example, the authentication input may be an input of pressing a button in an outer housing of the home appliance 100.

When the authentication input is received, the processor 120 may transmit, to the mobile device 200 through the communication interface 110 information about the authentication input. The 'information about the authentication input' refers to information indicating that the user has been authenticated as the genuine owner of the home appliance 100. The processor 120 may transmit a temporary password to the mobile device 200 only when the user authentication input is received. A method, performed by the home appliance 100, of receiving the user authentication input will be described in detail with reference to FIGS. 7 and 8.

In an embodiment of the disclosure, the home appliance 100 may further include a home appliance function module 1160 (see FIG. 11) configured to perform an original function and/or operation of the home appliance 100. The home appliance function module 1160 may include, for example, a cooler, a container, a door, a temperature sensor, a door opening/closing sensor, a lamp, and the like, which are provided in a refrigerator. As another example, the home appliance function module 1160 may include a washing tub, a motor, a door, a door opening/closing sensor, a water supply unit, a drain unit, and the like, which are provided in a washing machine. As another example, the home appliance function module 1160 may include a vacuum suction assembly, a dust container, a brush, and the like, which are provided in a vacuum cleaner.

Figure 3:
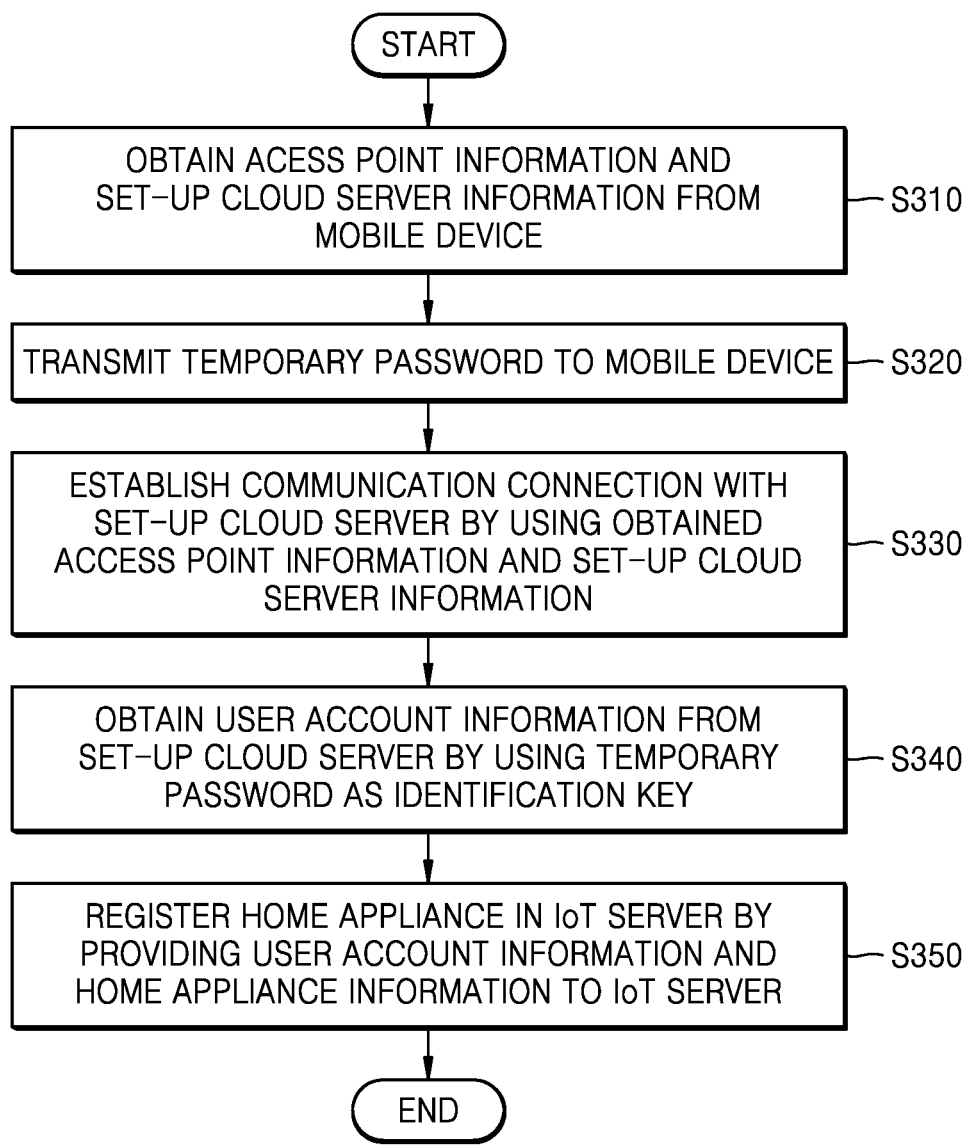
FIG. 3 is a flowchart illustrating an operating method of a home appliance, according to an embodiment of the disclosure.

FIG. 3 is a flowchart illustrating an operating method of the home appliance 100, according to an embodiment of the disclosure.

In operation S310, the home appliance 100 obtains AP information and set-up cloud server information from the mobile device 200 (see FIG. 1). The home appliance 100 and the mobile device 200 may transmit and receive data through a D2D communication connection. In an embodiment of the disclosure, the processor 130 (see FIG. 2) of the home appliance 100 may control, by executing predefined instructions or program code, the communication interface 110 (see FIG. 2) to operate as a SoftAP. When the communication interface 110 operates as the SoftAP, the mobile device 200 may access the home appliance 100 through an SSID of the SoftAP, and thus the D2D communication connection may be established. The communication connection between the home appliance 100 and the mobile device 200 may be, for example, data communication using Wi-Fi Direct. However, the disclosure is not limited thereto.

The home appliance 100 may receive, from the mobile device 200 through the D2D communication connection, access information of the home AP 500 (see FIG. 1) and information of the set-up cloud server 300 (see FIG. 1). In an embodiment of the disclosure, the home appliance 100 may receive information of the home AP 500 including information about an SSID, a password, and an encryption type of the home AP 500, and IP address information of the set-up cloud server 300.

In an embodiment of the disclosure, the home appliance 100 may transmit, to the mobile device 200 through the D2D communication connection, device information including at least one of device identification information (e.g., a device ID), a device type, ownership state information, or operation state information.

In operation S320, the home appliance 100 transmits a temporary password to the mobile device 200. In an embodiment of the disclosure, the home appliance 100 may generate the temporary password by using an arbitrarily generated random number and at least one of characters, numbers, which indicate device identification information (e.g., a device ID), or a combination thereof. The temporary password may be, for example, an OTP. The home appliance 100 may transmit the temporary password to the mobile device 200 through the D2D communication connection.

In operation S330, the home appliance 100 performs a communication connection with the set-up cloud server by using the obtained AP information and set-up cloud server information. In an embodiment of the disclosure, the home appliance 100 may access the set-up cloud server 300 by using the information of the home AP 500 (e.g., the SSID, password, and encryption type of the AP 500) and the information of the set-up cloud server 300 (e.g., the IP address information of the set-up cloud server 300), which are obtained in operation S310, and establish a D2S communication connection with the set-up cloud server 300.

In operation S340, the home appliance 100 obtains user account information from the set-up cloud server 300 by using the temporary password as an identification key. In an embodiment of the disclosure, the home appliance 100 may transmit, to the set-up cloud server 300, a query signal for requesting user account information mapped to the temporary password, together with the temporary password. The home appliance 100 may obtain the user account information mapped to the temporary password in a key-value format, among at least one user account stored in the set-up cloud server 300. In an embodiment of the disclosure, the home appliance 100 may receive the user account information from the set-up cloud server 300 through the D2S communication connection.

In an embodiment of the disclosure, the home appliance 100 may receive, from the set-up cloud server 300, server connection information for accessing the IoT server 400. For example, the home appliance 100 may receive the server connection information including, for example, at least one of an IP address of the IoT server 400, an access token of the IoT server 400, a location ID of the home appliance 100, a room ID, a nickname, or an APN.

In operation S350, the home appliance 100 registers the home appliance to the user account information in the IoT server 400 by providing the user account information and home appliance information to the IoT server 400 (see FIG. 1). In an embodiment of the disclosure, the home appliance 100 may establish a D2S communication connection with the IoT server 400 by using the server connection information. The home appliance 100 may sign in to the IoT server 400 by using the user account information. The home appliance 100 may register the home appliance 100 in a user account by transmitting, through the D2S communication connection, the user account information and at least one of device identification information, a device type, resource information, or profile information of the home appliance 100.

Figure 4:
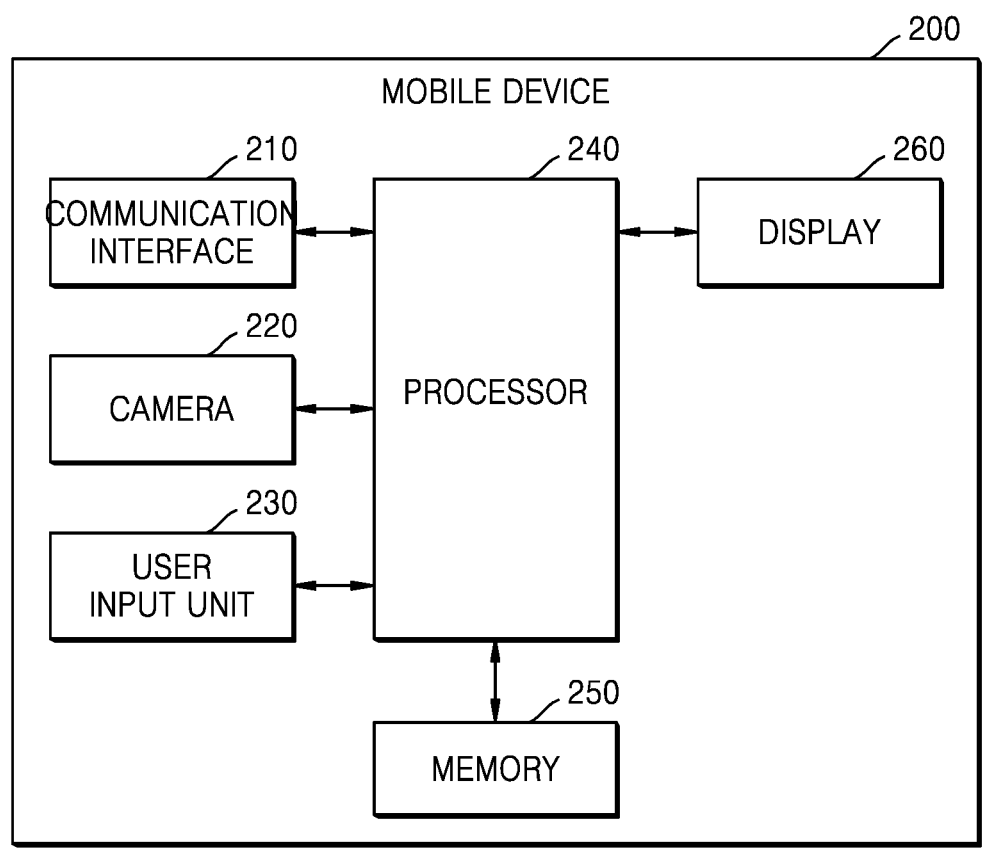
FIG. 4 is a block diagram illustrating components of a mobile device, according to an embodiment of the disclosure.

FIG. 4 is a block diagram illustrating components of the mobile device 200, according to an embodiment of the disclosure.

The mobile device 200 executes an application (e.g., a SmartThings application) stored in a memory 250, to perform operations of accessing the home appliance 100 and registering the home appliance 100 in the IoT server 400. The mobile device 200 according to an embodiment of the disclosure may be implemented in various forms. The mobile device 200 may be, but is not limited to, a smart phone. The mobile device 200 may be, for example, a tablet personal computer (PC), a laptop computer, a digital camera, an electronic book terminal, a digital broadcasting terminal, a personal digital assistant (PDA), a portable multimedia player (PMP), a navigation system, or an MP3 player. In an embodiment of the disclosure, the mobile device 200 may be a wearable device. The wearable device may include at least one of an accessory-type device (e.g., a watch, a ring, a cuff band, an ankle band, a necklace, spectacles, and a contact lens), a head-mounted device (HMD), a textile or garment-integrated device (e.g. electronic garments), a body attachment device (e.g., a skin pad), or a bio-implantable device (e.g., an implantable circuit).

Referring to FIG. 4, the mobile device 200 may include a communication interface 210, a camera 220, a user input unit 230, a processor 240, the memory 250, and a display 260. The communication interface 210, the camera 220, the user input unit 230, the processor 240, the memory 250, and the display 260 may be electrically and/or physically connected to each other.

The components illustrated in FIG. 4 are only those according to an embodiment of the disclosure, and the components included in the mobile device 200 are not limited to those illustrated in FIG. 4. The mobile device 200 may not include some of the components illustrated in FIG. 4, and may further include components not illustrated in FIG. 4. For example, the mobile device 200 may further include a sensor such as a geomagnetic sensor, an acceleration sensor, or a gyro sensor. As another example, the mobile device 200 may further include a biometric recognition sensor such as a fingerprint sensor, an iris sensor, or a face recognition sensor.

The communication interface 210 is configured to perform data communication with the home appliance 100 or the set-up cloud server 300 (see FIG. 1) through a wired or wireless communication network. For example, the communication interface 210 may include a short-range wireless communication module including at least one of Wi-Fi, Wi-Fi Direct, a Bluetooth communication module, BLE, NFC, Zigbee, an Ant+ communication module, or a microwave (μWave) communication module, and a mobile communication module including at least one of a legacy cellular communication module, a 5G communication module, or a GNSS communication module.

The communication interface 210, under the control by the processor 240, may access the SoftAP of the home appliance 100, so as to perform a D2D communication connection with the home appliance 100. In an embodiment of the disclosure, the communication interface 210 may establish the D2D communication connection with the communication interface 110 (see FIG. 2) of the home appliance 100 through Wi-Fi Direct.

The communication interface 210 may transmit, to the home appliance 100, information of the home AP 500 (see FIG. 1) and access information of the set-up cloud server 300, under the control by the processor 240. In an embodiment of the disclosure, the communication interface 210 may transmit, to the home appliance 100, AP information including information about an SSID, a password, and an encryption type of the home AP 500, and IP address information of the set-up cloud server 300.

The communication interface 210 may receive, from the home appliance 100, device information including at least one of device identification information (e.g., a device ID), a device type, ownership state information, or operation state information of the home appliance 100.

The camera 220 is a component for capturing a quick response (QR) code or barcode provided in the home appliance 100. The camera 220, under the control by the processor 240, captures an image of the QR code or barcode and provides the captured image to the processor 240 in order to authenticate the ownership of the user.

The user input unit 230 receives, from the outside (e.g., the user) of the mobile device 200, a command or data to be used for a component of the mobile device 200. The user input unit 230 may include, for example, at least one of a touch screen, a touch pad, a key, a microphone, a mouse, a keyboard, or a digital pen (e.g., a stylus pen). In an embodiment of the disclosure, the user input unit 230 may receive a user input for inputting user account information (e.g., a user ID and a password). In an embodiment of the disclosure, the user input unit 230 may also receive, from the user of the home appliance 100, a user authentication input for authenticating that the user is the owner.

The processor 240 may execute one or more instructions or program code stored in the memory 250, and perform a function and/or an operation corresponding to the instructions or the program code. The processor 240 may include a hardware component for performing arithmetic operations, logic operations, input/output operations, and signal processing. For example, the processor 240 may include, for example, at least one of CPUs, microprocessors, GPUs, APs, ASICs, DSPs, DSPDs, PLDs, or FPGAs, but is not limited thereto.

In an embodiment of the disclosure, the processor 240 may include a dedicated hardware chip that performs AI learning.

The memory 250 may store instructions and program code which are readable by the processor 240. The memory 250 may include, for example. at least one of a flash memory-type storage medium, a hard disk-type storage medium, a multimedia card micro-type storage medium, card-type memory (e.g., SD or XD memory), RAM, SRAM, ROM, EEPROM, PROM, magnetic memory, a magnetic disc, or an optical disc.

The processor 240 may receive a temporary password from the home appliance 100 through the communication interface 210. In an embodiment of the disclosure, the temporary password may be an OTP. The processor 240 may combine user account information and an OTP, which are input through the user input unit 230, and store the combined information in the memory 250. However, the disclosure is not limited thereto, and the mobile device 200 may further include a storage unit separate from the memory 250, and may store the user account information and the OTP in the storage unit. The storage unit may include a non-volatile memory.

The processor 240 may transmit the user account information and the OTP to the set-up cloud server 300 (see FIG. 1) through the communication interface 210.

In an embodiment of the disclosure, the processor 240 may determine, based on the ownership state information of the home appliance 100 received from the home appliance 100, whether the home appliance 100 is already registered with another user account. When it is determined that the home appliance 100 is not owned by the user, the processor 240 may receive a user authentication input for resetting the ownership state of the home appliance 100. In an embodiment of the disclosure, the user authentication input may include an input of capturing (or recognizing, scanning) the QR code or barcode provided in the home appliance 100 through the camera 220 or an input of receiving user authentication information from the home appliance 100 through an NFC module. A detailed embodiment in which the processor 240 receives the user authentication input for resetting the ownership state of the home appliance 100 will be described in detail with reference to FIGS. 7, 9A, and 9B.

The display 260 is configured to display an execution screen or a GUI of an application. The display 260 may be configured as a physical device including at least one of a liquid-crystal display (LCD), a thin-film-transistor liquid-crystal display (TFT-LCD), an organic light-emitting diode (OLED), a flexible display, a three-dimensional (3D) display, or an electrophoretic display, but is not limited thereto. In an embodiment of the disclosure, the display 260 may be configured as a touch screen including a touch interface. When the display 260 is configured as a touch screen, the display 260 may be a component integrated with the user input unit 230 configured as a touch panel.

In an embodiment of the disclosure, the display 260 may display a GUI for receiving a user authentication input under the control by the processor 240.

Figure 5:
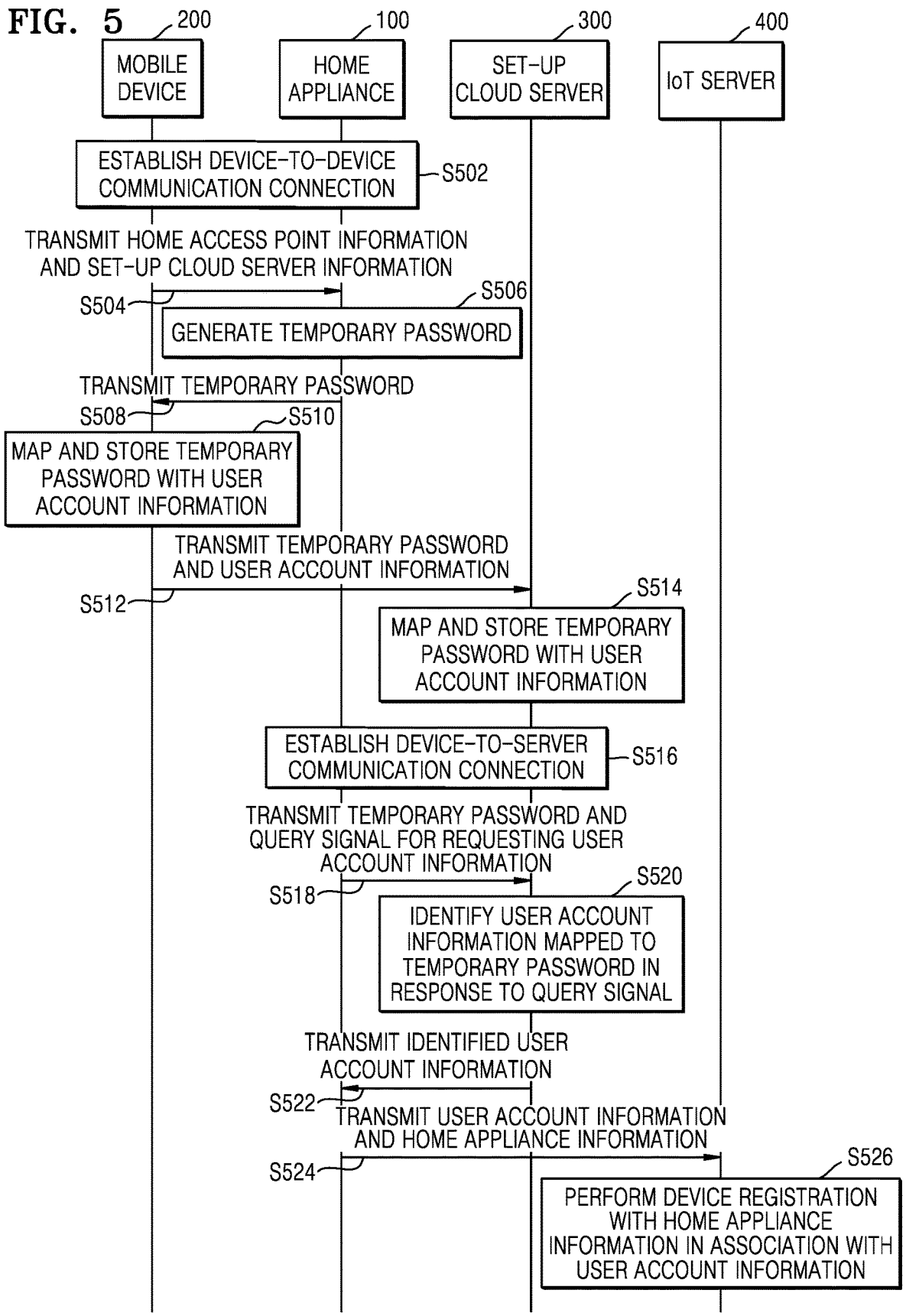
FIG. 5 is a flowchart illustrating an operating method of a home appliance, a mobile device, a set-up cloud server, and an IoT server, according to an embodiment of the disclosure.

FIG. 5 is a flowchart illustrating an operating method of the home appliance 100, the mobile device 200, the set-up cloud server 300, and the IoT server 400, according to an embodiment of the disclosure.

FIG. 5 illustrates an embodiment of device registration in which the home appliance 100 registers the home appliance 100 in the IoT server 400 through a D2D communication connection with the mobile device 200, and a D2S communication connection with the set-up cloud server 300 and the IoT server 400.

In operation S502, the home appliance 100 and the mobile device 200 establish a D2D communication connection. In an embodiment of the disclosure, the home appliance 100 may perform a SoftAP operation such that the communication interface 110 (see FIG. 2) operates as a SoftAP. The home appliance 100 may assign an SSID to the communication interface 110, and set the assigned SSID as an SSID of the SoftAP. The mobile device 200 may access the SoftAP through the SSID of the communication interface 110 of the home appliance 100, and thus the D2D communication connection between the home appliance 100 and the mobile device 200 may be performed. In an embodiment of the disclosure, the home appliance 100 and the mobile device 200 may be connected to each other by using a Wi-Fi Direct communication scheme.

In operation S504, the mobile device 200 transmits, to the home appliance 100, home AP information and set-up cloud server information. In an embodiment of the disclosure, the mobile device 200 may transmit, to the home appliance 100 through the D2D communication connection, information of the home AP 500 including information about an SSID, a password, and an encryption type of the home AP 500 (see FIG. 1), and the IP address information of the set-up cloud server 300 (see FIG. 1).

In operation S506, the home appliance 100 generates a temporary password. In an embodiment of the disclosure, the home appliance 100 may generate the temporary password by using an arbitrarily generated random number and at least one of characters, numbers, or a combination thereof, which indicate device identification information. The temporary password may be, for example, an OTP.

In operation S508, the home appliance 100 transmits the temporary password to the mobile device 200. In an embodiment of the disclosure, the home appliance 100 may transmit the temporary password to the mobile device 200 through the D2D communication connection.

In operation S510, the mobile device 200 maps and stores user account information with the temporary password. In an embodiment of the disclosure, the mobile device 200 may map and store user account information which is input through a device registration application (e.g., a SmartThings application) with the temporary password received from the home appliance 100. The 'user account information' may include, for example, a user ID and password information. Here, the 'user ID' may be an ID, an email address, or an identification value of the email address, which is set by a user.

In operation S512, the mobile device 200 transmits the temporary password and the user account information to the set-up cloud server 300.

In operation S514, the set-up cloud server 300 maps and stores the temporary password with the user account information. In an embodiment of the disclosure, the set-up cloud server 300 may map and store a plurality of temporary passwords with a plurality of pieces of user account information, in a key-value format. In an embodiment of the disclosure, the user account database 330 (see FIG. 6) included in the set-up cloud server 300 may store a plurality of OTPs 610-1 to 610-n (see FIG. 6) (hereinafter, also referred to as the second OTP 610-2) as keys, and a plurality of pieces of corresponding user account information 620-1 to 620-n (see FIG. 6) (hereinafter, also referred to as the plurality of user accounts 620-1 to 620-n, and the second user account information 620-2) as values. The user account database 330 will be described in detail with reference to FIG. 6.

In operation S516, the home appliance 100 establishes a device-to-server communication connection D2S with the set-up cloud server 300. The home appliance 100 may perform a communication connection with the set-up cloud server 300 by using the information of the home AP 500 and the information of the set-up cloud server 300, which are received in operation S504. In an embodiment of the disclosure, the home appliance 100 may access the set-up cloud server 300 by using the SSID and the password of the home AP 500, and the IP address information of the set-up cloud server 300, and may establish the D2S communication connection with the set-up cloud server 300.

In operation S518, the home appliance 100 transmits, to the set-up cloud server 300, a query signal for requesting user account information, and the temporary password. In an embodiment of the disclosure, the query signal is a signal for requesting user account information mapped to the temporary password used as an identification key.

In operation S520, the set-up cloud server 300, in response to the query signal, identifies the user account information mapped to the temporary password. In an embodiment of the disclosure, the set-up cloud server 300 may identify, among the plurality of user accounts 620-1 to 620-n, which are pre-stored in the user account database 330, the user account mapped to the temporary password received from the home appliance 100 in a key-value format.

In operation S522, the set-up cloud server 300 transmits the identified user account information to the home appliance 100. In an embodiment of the disclosure, the set-up cloud server 300 may transmit, to the home appliance 100, server connection information for accessing the IoT server 400, in addition to the user account information. For example, the set-up cloud server 300 may transmit, to the home appliance 100, the server connection information including at least one of an IP address of the IoT server 400, an access token of the IoT server 400, a location ID of the home appliance 100, a room ID, a nickname, or an APN.

In operation S524, the home appliance 100 transmits, to the IoT server 400, the user account information and home appliance information. The home appliance 100 may sign in to the IoT server 400 by using the server connection information received from the set-up cloud server 300. The home appliance 100 may transmit at least one of device identification information, a device type, resource information, or profile information of the home appliance 100, together with the user account information. Here, the 'resource information' may be, for example, information about power supply, a mode (e.g., a standard mode, a blanket mode, a towel mode, or the like when the home appliance 100 is a washing machine, or a cooling function, a dehumidifying mode, a wind-free mode, or the like when the home appliance 100 is an air conditioner), and a function of the home appliance 100. The 'profile information' may be information about at least one of a firmware version, an application version, or an Easy Setup version of the home appliance 100.

In operation S526, the IoT server 400 associates the home appliance information with the user account information to perform device registration.

Figure 6:
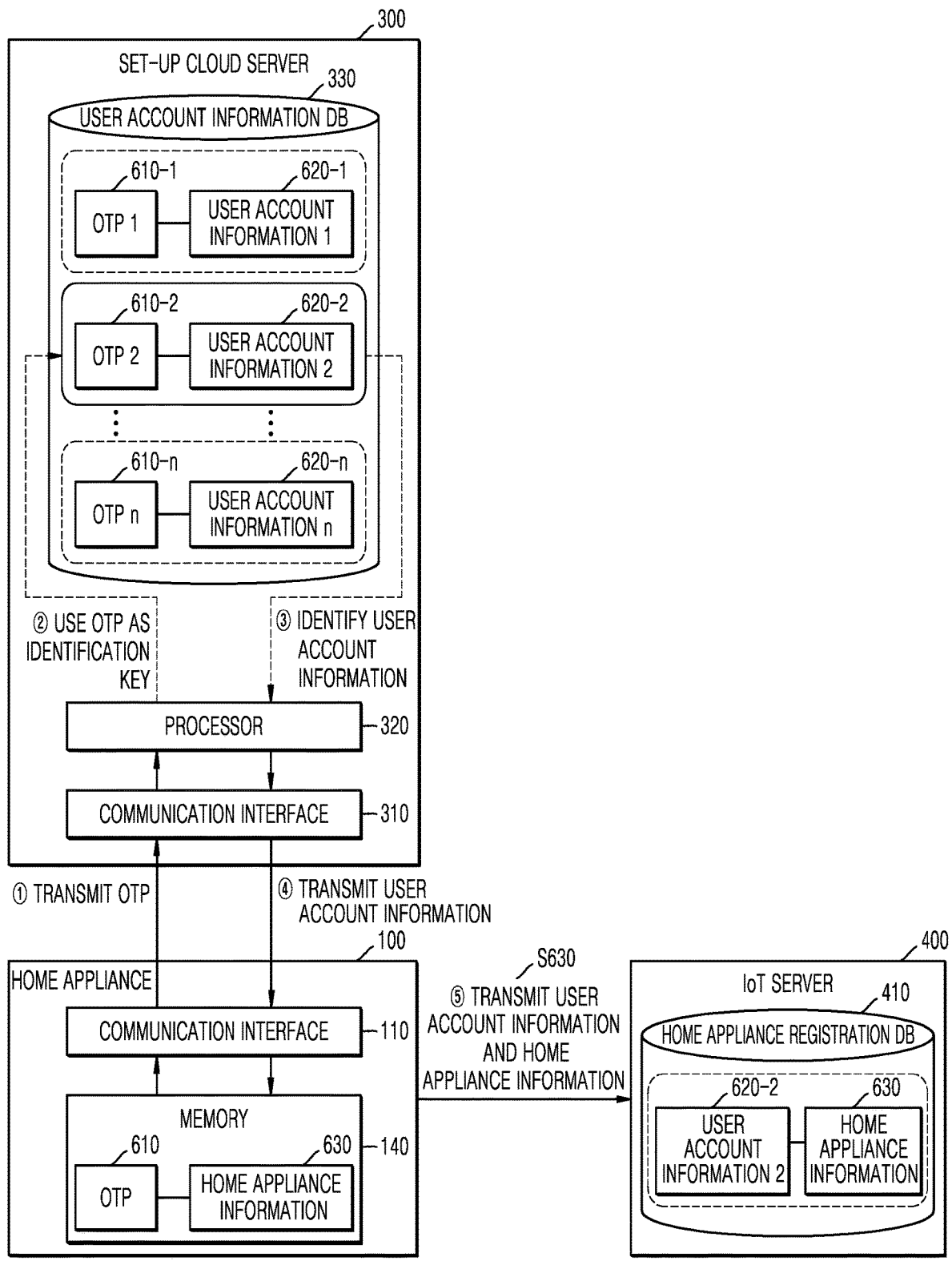
FIG. 6 is a diagram illustrating an embodiment in which a home appliance of the disclosure obtains user account information from a set-up cloud server by using a one-time password (OTP) as an identification key and performs device registration by using the obtained user account information.

FIG. 6 is a diagram illustrating an embodiment in which the home appliance 100 of the disclosure obtains user account information from the set-up cloud server 300 by using an OTP as an identification key and performs device registration in the IoT server 400 by using the obtained user account information.

Referring to FIG. 6, the home appliance 100, the set-up cloud server 300, and the IoT server 400 may be connected to each other, and transmit and receive data to and from each other, through a D2S communication connection. The home appliance 100 may be connected to a communication interface 310 of the set-up cloud server 300 through the communication interface 110.

The home appliance 100 may transmit an OTP 610 and home appliance information 630, which are stored in the memory 130, to the set-up cloud server 300 through the communication interface 110. The OTP 610 is a temporary password generated by the home appliance 100, and may include an arbitrarily generated random number and at least one of characters, numbers, which indicate device identification information (e.g., a device ID), or a combination thereof. The home appliance information 630 may include, for example, at least one of device identification information, a device type, resource information, or profile information. FIG. 6 illustrates that the OTP 610 and the home appliance information 630 are stored in the memory 130, but this is merely exemplary, and the disclosure is not limited thereto. In an embodiment of the disclosure, the OTP 610 and the home appliance information 630 may be stored in a storage unit which is separate from the memory 130. The storage unit may include, for example, a non-volatile memory.

The set-up cloud server 300 may include the communication interface 310, a processor 320, and the user account database 330. The communication interface 310 may transmit and receive data to and from the home appliance 100 by using, for example, at least one of a wired LAN, a wireless LAN, Wi-Fi, WiBro, WiMAX, shared wireless access protocol (SWAP), WiGig, a legacy network (e.g., 3G communication network, LTE), a 5G communication network, or radio frequency (RF) communication. The communication interface 310 receives an OTP from the communication interface 110 of the home appliance 100 and provides the received OTP to the processor 320.

The processor 320 may identify, from the user account database 330, user account information that matches the OTP by using the OTP as an identification key.

The user account database 330 is a database that maps and stores at least one OTP with at least one piece of user account information in a key-value format. In the embodiment shown in FIG. 6, the user account database 330 may store the plurality of OTPs 610-1 to 610-*n* as keys and the plurality of pieces of corresponding user account information 620-1 to 620-*n* as values.

The user account database 330 may include a non-volatile memory. The non-volatile memory refers to a recording medium that may store and retain information even when power is not supplied, and may use the stored information when power is supplied The non-volatile memory may include at least one of a flash memory, a hard disk, a solid-state drive (SSD), a multimedia card micro-type memory, a card-type memory (e.g., an SD or XD memory), ROM, a magnetic disk, or an optical disk.

The processor 320 may compare the OTP 610 received from the home appliance 100 with the plurality of OTPs 610-1 to 610-*n* stored in the user account database 330, and identify the same OTP. The processor 320 may identify, among the plurality of user accounts 620-1 to 620-*n* stored in the user account database 330, a user account mapped to the identified OTP in the key-value format. In the embodiment illustrated in FIG. 6, the processor 320 may identify, among the plurality of OTPs 610-1 to 610-*n*, the second OTP 610-2, which is the same as the OTP 610 received from the home appliance 100, and identify the second user account information 620-2, which is a user account mapped to the second OTP 610-2 as an identification key. The processor 320 may extract the identified second user account information 620-2.

The processor 320 may provide the extracted second user account information 620-2 to the communication interface 310.

The communication interface 310 may transmit the second user account information 620-2 to the communication interface 110 of the home appliance 100.

The home appliance 100 may transmit, to the IoT server 400, the second user account information 620-2 received through the communication interface 110 and the home appliance information 630 stored in the memory 130.

The IoT server 400 may store the second user account information 620-2 and the home appliance information 630 in a home appliance registration database 410, thereby registering the home appliance 100 in association with the user account information.

In the embodiments illustrated in FIGS. 5 and 6, because the home appliance 100 obtains the user account information from the mobile device 200 by using the temporary password such as an OTP, and obtains the user account information from the set-up cloud server 300 by using the temporary password as the identification key, a situation in which the user account information of the user who intends to register the home appliance 100, among the plurality of pieces of user account information 620-1 to 620-*n* pre-stored in the user account database 330 of the set-up cloud server 300, is incorrectly input may be prevented in advance, and the accuracy of device registration may be improved. In addition, because the home appliance 100 of the disclosure performs device registration through the user account information obtained by using the temporary password, it is possible to prevent another user, who is not the genuine owner of the home appliance 100, from remotely registering and controlling the home appliance 100 through the mobile device 200, and thus a technical effect of enhancing security may be provided.

Figure 7:
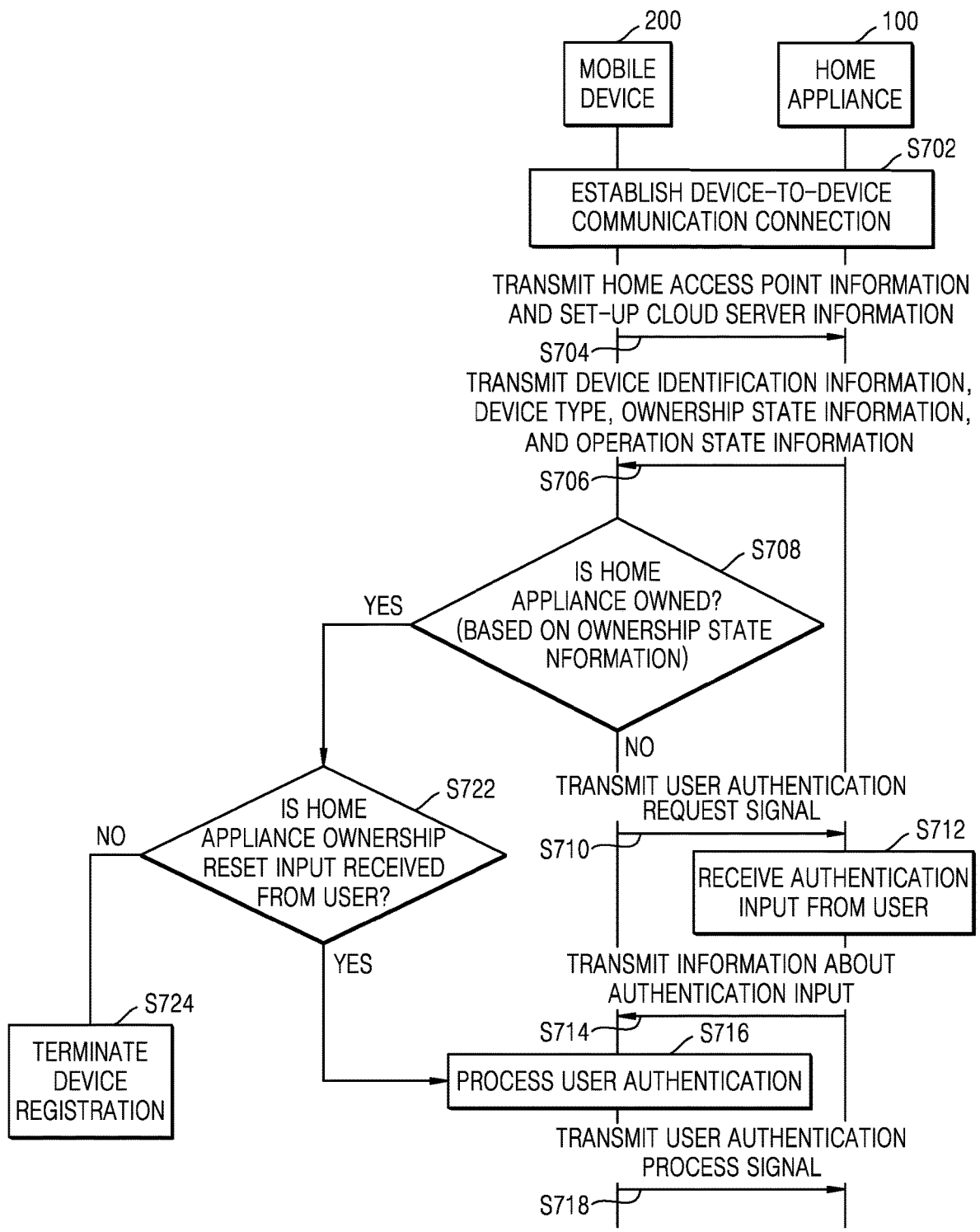
FIG. 7 is a flowchart illustrating a method, performed by a home appliance and a mobile device, of performing user authentication, according to an embodiment of the disclosure.

FIG. 7 is a flowchart illustrating a method, performed by the home appliance 100 and the mobile device 200, of performing user authentication, according to an embodiment of the disclosure.

In operation S702, the home appliance 100 and the mobile device 200 establish a D2D communication connection.

In operation S704, the mobile device 200 transmits, to the home appliance 100, home AP information and set-up cloud server information.

Operations S702 and S704 are the same as operations S502 and S504 shown in FIG. 5, respectively, and thus repetitive descriptions thereof will be omitted.

In operation S706, the home appliance 100 transmits, to the mobile device 200, device identification information, a device type, ownership state information, and operation state information of the home appliance 100. Here, the 'ownership state information' refers to information about whether the home appliance 100 is previously registered with another user account. In an embodiment of the disclosure, when the home appliance 100 is already registered with another user account, the ownership state information may include registered user account information. When the home appliance 100 is not registered with any user account, the ownership state information may include new product state (i.e., OOB) information.

In operation S708, the mobile device 200 determines whether the home appliance 100 is owned, based on the ownership state information. The mobile device 200 may determine, based on the ownership state information received from the home appliance 100, whether the user of the mobile device 200 is a genuine owner of the home appliance 100. In an embodiment of the disclosure, the mobile device 200 may determine, based on the ownership state information, whether the home appliance 100 is already registered with another user account.

When it is determined, based on the ownership state information, that the home appliance 100 is in the new product state, which means that the home appliance 100 is not registered with any user account (operation S710), the mobile device 200 transmits a user authentication request signal to the home appliance 100. Even when it is determined, based on the ownership state information, that the home appliance 100 is not registered with any user account, the mobile device 200 may request user authentication in order to determine whether the user of the mobile device 200 is the genuine owner of the home appliance 100.

In operation S712, upon receipt of the user authentication request signal from the mobile device 200, the home appliance 100 receives an authentication input from the user. In an embodiment of the disclosure, the home appliance 100 may receive a user authentication input through the user input unit.

Figure 8:
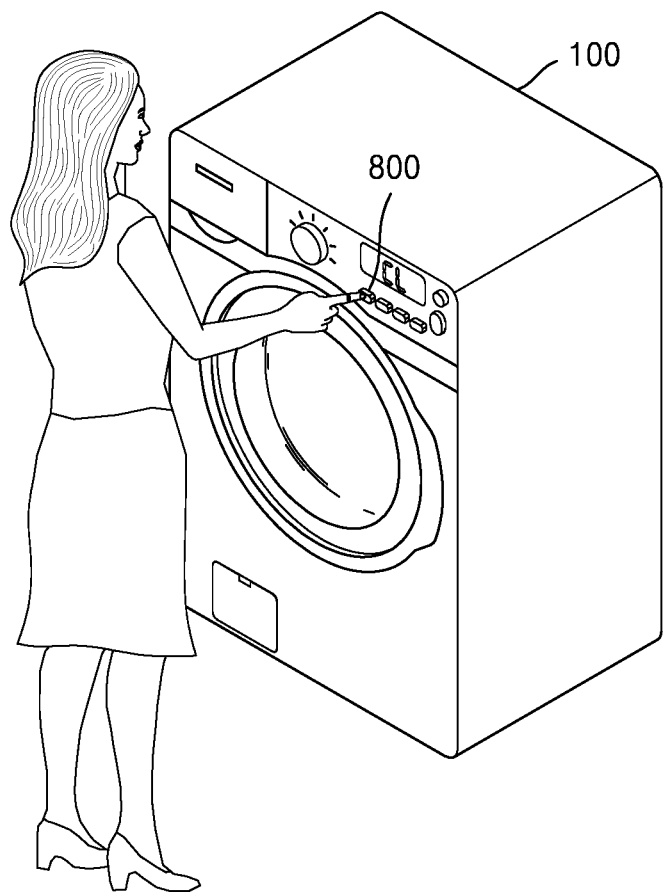
FIG. 8 is a diagram illustrating a method, performed by a home appliance, of receiving a user authentication input, according to an embodiment of the disclosure.

FIG. 8 is a diagram illustrating an embodiment in which the home appliance 100 receives a user authentication input through the user input unit. Referring to operation S712 of FIG. 7 together with the embodiment illustrated in FIG. 8, the home appliance 100 may receive a user authentication input of pressing a button 800 exposed to the outside. In an embodiment of the disclosure, the button 800 may be preset to receive a user authentication input, and the home appliance 100 may determine that a user authentication input is received upon receipt of a user input of pressing the button 800 for a preset time (e.g., 2 seconds). The user authentication input is illustrated as pressing the externally exposed hardware button 800 in the embodiment illustrated in FIG. 8, but the user authentication input is not limited to being received through the button 800. For example, the button 800 may be replaced with a touch pad or a touch screen, and a user authentication input may be received through a touch input received through the touch pad or the touch screen.

The user authentication input is not limited to the embodiment illustrated in FIG. 8. In an embodiment of the disclosure, the home appliance 100 may include a display (not shown) and display, on the display, certain characters, numbers, or symbols for authentication, and the mobile device 200 may perform user authentication by receiving, through an executed application (e.g., a SmartThings application), a user input of inputting the characters, numbers, or symbols displayed on the display of the home appliance 100.

Referring back to FIG. 7, in operation S714, the home appliance 100 transmits, to the mobile device 200, information about the user authentication input.

In operation S716, the mobile device 200 performs user authentication process.

In operation S718, the mobile device 200 transmits a user authentication process signal to the home appliance 100.

When it is determined, based on the ownership state information, that the home appliance 100 is already registered with another user account rather than the user account with which the mobile device 200 is logged in (operation S722), the mobile device 200 determines whether a home appliance ownership reset input is received from the user. The home appliance ownership reset input refers to a user authentication input for resetting the ownership state information of the home appliance 100 which is already registered with another user account. In an embodiment of the disclosure, the home appliance ownership reset input may be received through the mobile device 200. The mobile device 200 may perform a user authentication process by receiving the home appliance ownership reset input. An embodiment in which the mobile device 200 performs a user authentication process of the home appliance 100 will be described in detail with reference to FIGS. 9A and 9B.

When the home appliance ownership reset input is received, the mobile device 200 performs a user authentication process (operation S716).

The home appliance 100 determines whether to transmit a temporary password to the mobile device 200, according to a user authentication result. In an embodiment of the disclosure, when the user authentication process is successfully performed by the mobile device 200, the home appliance 100 may transmit the temporary password to the mobile device 200. Operations S506 and S508 illustrated in FIG. 5 may be performed after operation S718 of FIG. 7 is performed.

When the home appliance ownership reset input is not received, the mobile device 200 terminates the device registration (operation S724). In this case, the home appliance 100 does not transmit the temporary password to the mobile device 200.

Figure 9A:
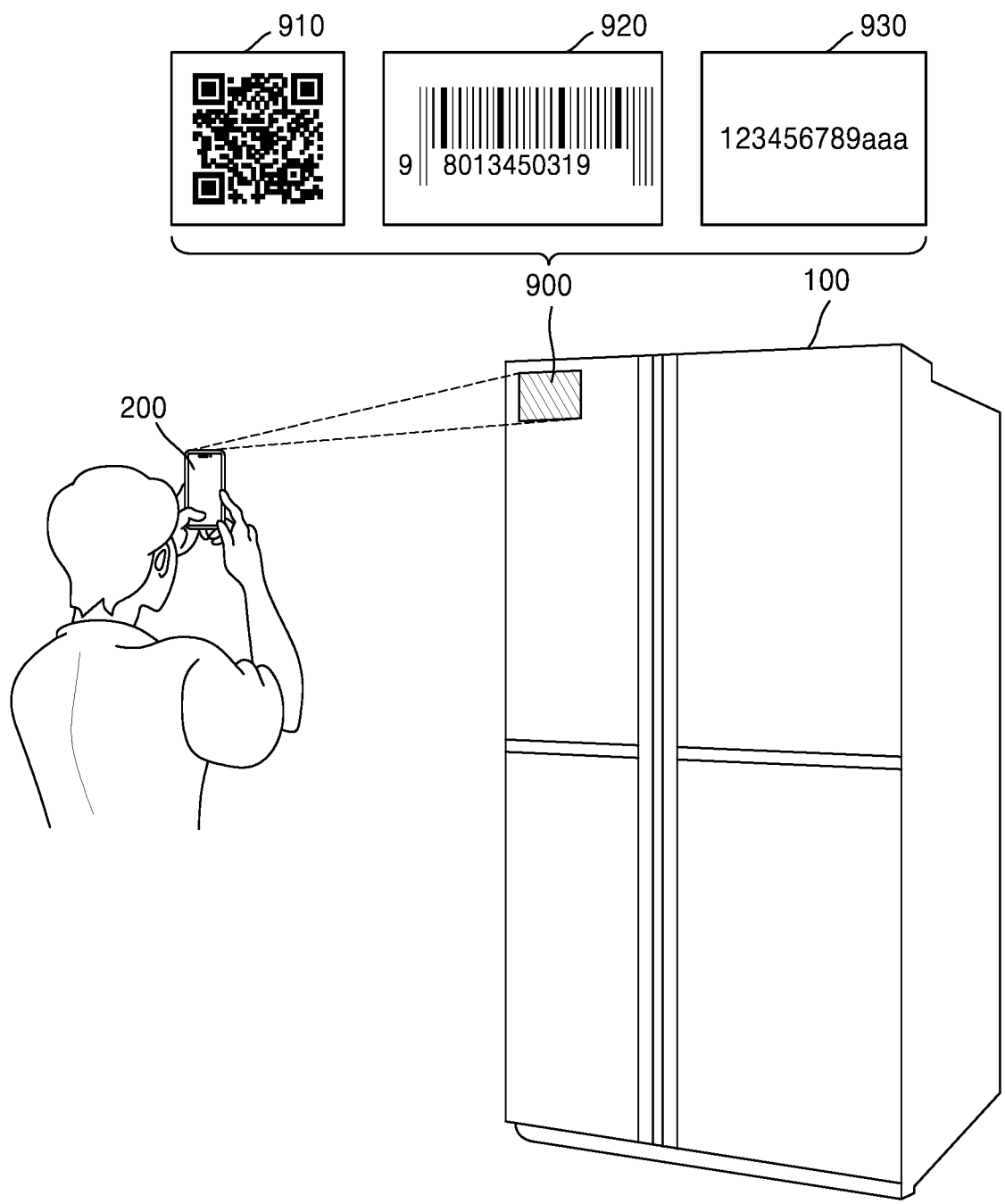
FIG. 9A is a diagram illustrating an embodiment in which a mobile device of the disclosure obtains user authentication information from a home appliance and performs a user authentication process.

FIG. 9A is a diagram illustrating an embodiment in which the mobile device 200 of the disclosure obtains user authentication information from the home appliance 100 and performs a user authentication process.

Referring to FIG. 9A, the mobile device 200 may obtain the user authentication information by capturing user authentication information indicated on the exterior of the home appliance 100. The mobile device 200 may include the camera 220 (refer to FIG. 4), and may capture the user authentication information on the exterior of the home appliance 100 by using the camera 220. The user authentication information may be printed or attached on an authentication information area 900 of the housing of the home appliance 100.

In an embodiment of the disclosure, the user authentication information includes a QR code 910. The QR code 910 may include information corresponding to the user authentication information. The mobile device 200 may capture the QR code 910 by using the camera 220, and recognize the captured QR code 910 to obtain the user authentication information.

In an embodiment of the disclosure, the user authentication information includes a barcode 920. The barcode 920 may include information corresponding to the user authentication information. The mobile device 200 may capture the barcode 920 by using the camera 220, and recognize the captured barcode 920 to obtain the user authentication information.

The QR code 910 or the barcode 920 may be linked to an address of a preset cloud server configured to perform user authentication. In an embodiment of the disclosure, the QR code 910 or the barcode 920 may be linked to the set-up cloud server 300 (see FIG. 1). The mobile device 200 having captured the QR code 910 or the barcode 920 may access the set-up cloud server 300 by using its IP address such that user authentication is performed by the set-up cloud server 300. The mobile device 200 may receive, from the set-up cloud server 300, authentication completion information indicating that the user authentication is completed. The 'authentication completion information' may be information previously registered in the home appliance 100. For example, the authentication completion information may be predefined identification information.

In another embodiment of the disclosure, the user authentication information includes a serial number 930. The serial number 930 may include information corresponding to the user authentication information. The mobile device 200 may capture the serial number 930 by using the camera 220, and recognize the captured serial number 930 to obtain the user authentication information.

In an embodiment of the disclosure, the home appliance 100 may include at least one of the QR code 910, the barcode 920, or the serial number 930, or a combination thereof. The home appliance 100 may provide various combinations of user authentication information so as to selectively collect user authentication information according to functions supported by the mobile device 200 (e.g., camera functions, QR code recognition, barcode recognition, etc.) or a user's preference.

Although not illustrated in the embodiment of FIG. 9A, the home appliance 100 may include a display and display at least one of the QR code 910, the barcode 920, or the serial number 930 on the display. The mobile device 200 may also obtain the user authentication information by capturing the QR code 910, the barcode 920, or the serial number 930 displayed through the display of the home appliance 100.

Figure 9B:
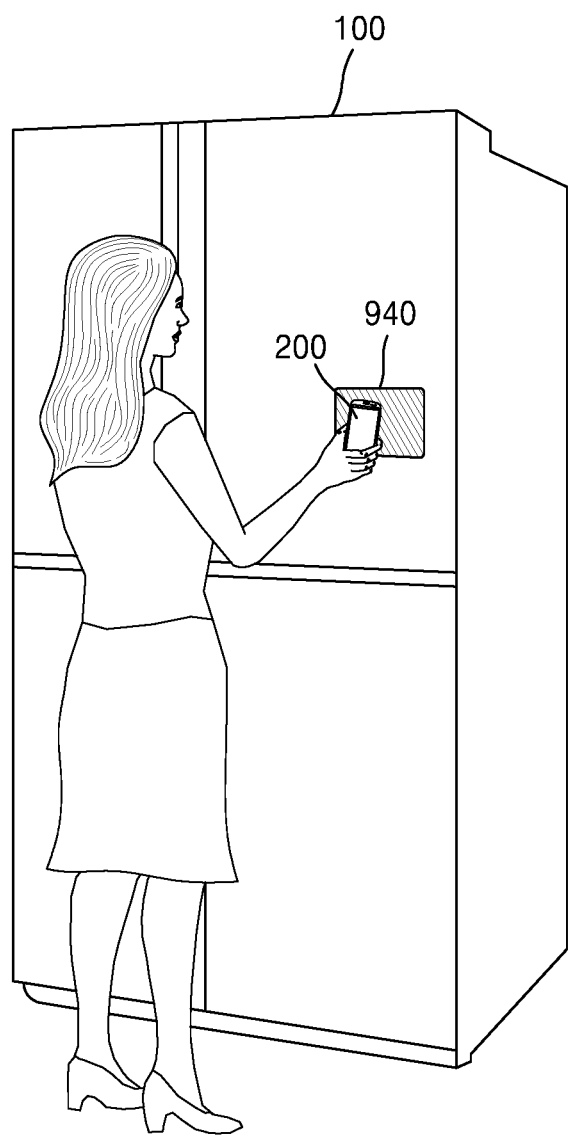
FIG. 9B is a diagram illustrating an embodiment in which a mobile device of the disclosure performs a user authentication process by using a near-field communication (NFC) scheme.

FIG. 9B is a diagram illustrating an embodiment in which the mobile device 200 of the disclosure performs a user authentication process by using an NFC scheme.

Referring to FIG. 9B, the home appliance 100 may transmit the user authentication information to the mobile device 200 in the NFC scheme. In an embodiment of the disclosure, the home appliance 100 may include an NFC tag area 940. When the mobile device 200 is at a position adjacent to the NFC tag area 940 of the home appliance 100 by a preset interval, the mobile device 200 may receive the user authentication information from the home appliance 100 through NFC. In an embodiment of the disclosure, after the D2D communication connection D2D is established, the mobile device 200 may display a guide UI for instructing the user to place the mobile device 200 adjacent to the NFC tag area 940. The user may place the mobile device 200 adjacent to the NFC tag area 940 according to the guide UI displayed by the mobile device 200. When the user places the mobile device 200 adjacent to the NFC tag area 940, the mobile device 200 may receive the user authentication information from the home appliance 100.

The mobile device 200 may perform a user authentication process by using the received user authentication information.

Figure 10:
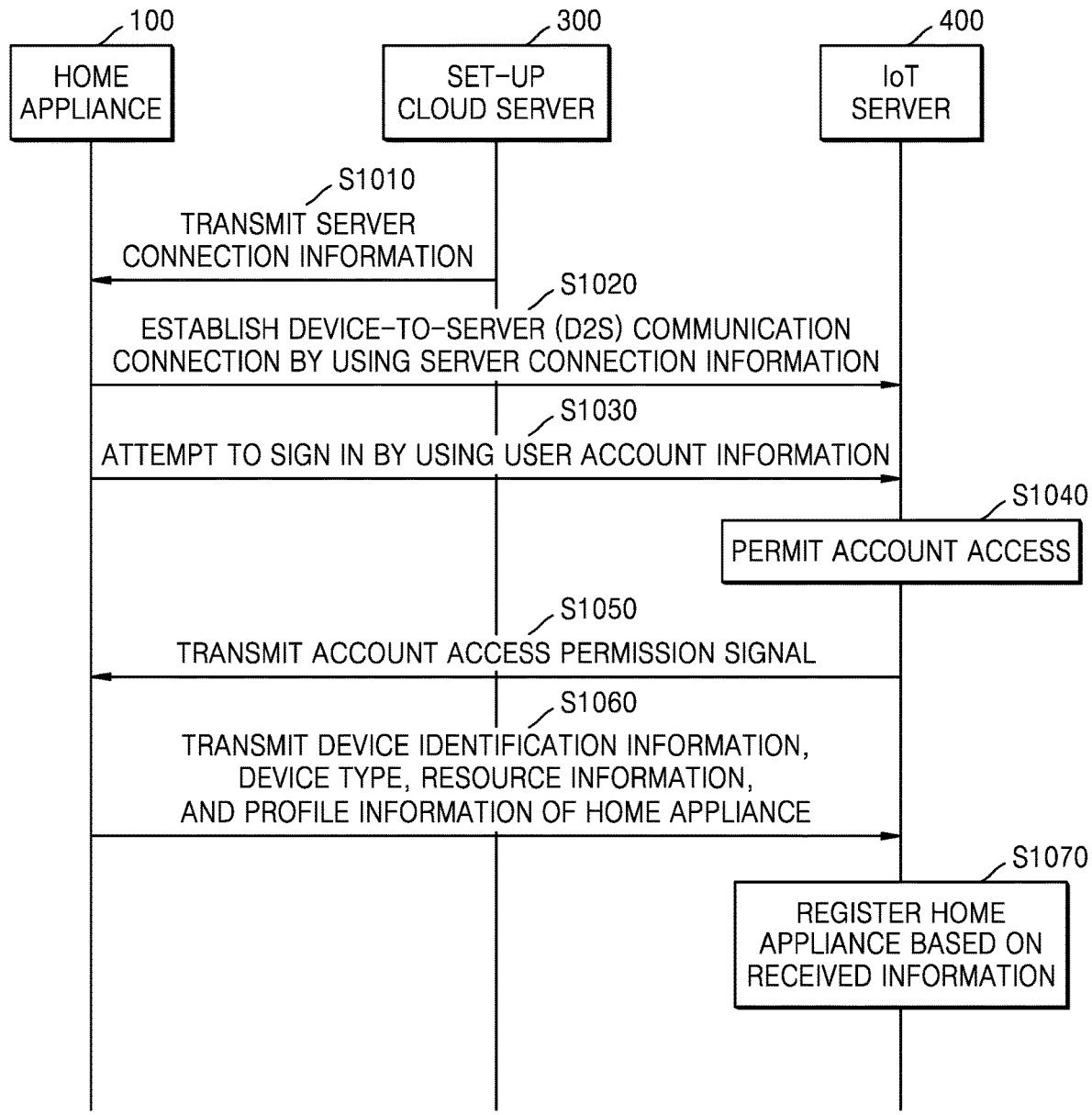
FIG. 10 is a flowchart illustrating a method, performed by a home appliance, a set-up cloud server, and an IoT server, of performing device registration, according to an embodiment of the disclosure.

FIG. 10 is a flowchart illustrating a method, performed by the home appliance 100, the set-up cloud server 300, and the IoT server 400, of performing device registration, according to an embodiment of the disclosure.

In operation S1010, the set-up cloud server 300 transmits server connection information to the home appliance 100. The 'server connection information' refers to connection information to the IoT server 400 for the home appliance 100 to access the IoT server 400 and establish a D2S communication connection. The set-up cloud server 300 may transmit, to the home appliance 100, the server connection information including, for example, at least one of an IP address of the IoT server 400, an access token of the IoT server 400, a location ID of the home appliance 100, a room ID, a nickname, or an APN.

In operation S1020, the home appliance 100 establishes the D2S communication connection by using the server connection information. In an embodiment of the disclosure, the home appliance 100 may perform the D2S communication connection with the IoT server 400 through the APN of the home AP 500. The D2S communication connection may be performed through, for example, at least one data communication network of a wired LAN, a wireless LAN, Wi-Fi, WiBro, WiMAX, SWAP, WiGig, a legacy network (e.g., 3G communication network, LTE), a 5G communication network, or RF communication. The home appliance 100 and the IoT server 400 may transmit and receive a control signal and data through the D2S communication connection.

In operation S1030, the home appliance 100 attempts to sign in to the IoT server 400 by using user account information. The user account information may include, for example, a user ID and password information. Here, the 'user ID' may be an ID, an email address, or an identification value of the email address, which is set by the user.

In operation S1040, the IoT server 400 permits the account access.

In the case where the user account with which the home appliance 100 attempts to access is not registered in the IoT server 400, the procedure is terminated.

In operation S1050, the IoT server 400 transmits an account access permission signal to the home appliance 100.

In operation S1060, the home appliance 100 transmits, to the IoT server 400, at least one of device identification information, a device type, resource information, or profile information of the home appliance 100. The 'resource information' may be, for example, information about power supply, a mode (e.g., a standard mode, a blanket mode, a towel mode, or the like when the home appliance 100 is a washing machine, or a cooling function, a dehumidifying mode, a wind-free mode, or the like when the home appliance 100 is an air conditioner), and a function of the home appliance 100. The 'profile information' may be information about at least one of a firmware version, an application version, or an Easy Setup version of the home appliance 100.

In operation S1070, the IoT server 400 registers the home appliance 100 based on the received information. In an embodiment of the disclosure, the IoT server 400 may store the device identification information, the device type, the resource information, and the profile information received from the home appliance 100 in association with the user account information used in operation S1030. As the IoT server 400 associates and stores the user account with the information of the home appliance 100, the home appliance 100 is completely registered in the IoT server 400.

Figure 11:
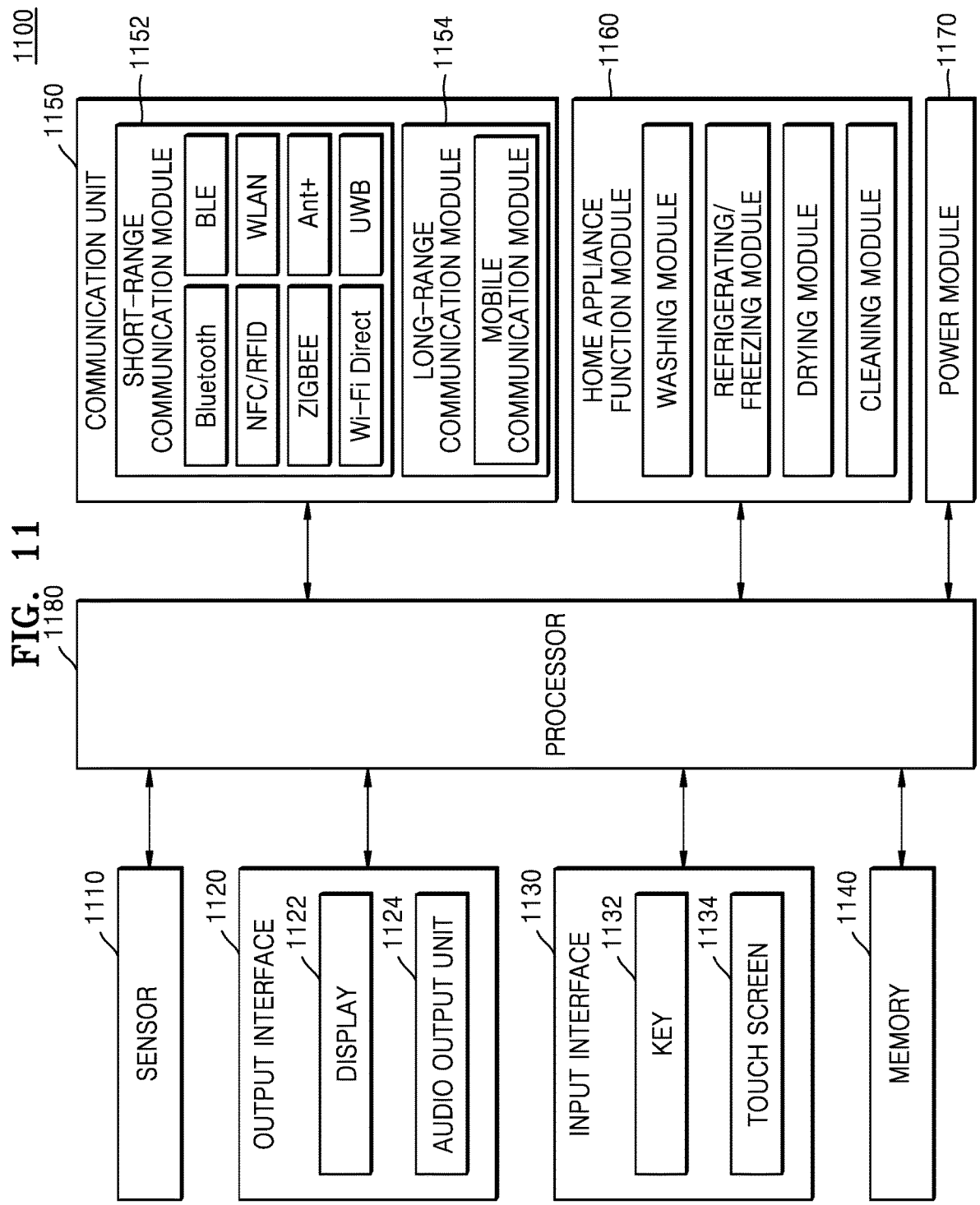
FIG. 11 is a block diagram illustrating a structure of a home appliance, according to an embodiment of the disclosure.

FIG. 11 is a block diagram illustrating a structure of a home appliance 1100, according to an embodiment of the disclosure.

The home appliance 1100 illustrated in FIG. 11 may correspond to the home appliance 100 illustrated in FIGS. 1, 2, and 5 through 10.

Referring to FIG. 11, the home appliance 1100 may include a sensor 1110, an output interface 1120, an input interface 1130, a memory 1140, a communication unit 1150, the home appliance function module 1160, a power module 1170, and a processor 1180. The home appliance 1100 may be configured by various combinations of the components illustrated in FIG. 11, and the components illustrated in FIG. 11 are not essential components.

The home appliance 1100 of FIG. 11 may correspond to the home appliance 100 described with reference to FIG. 2, the memory 1140 may correspond to the memory 130 described with reference to FIG. 2, the processor 1180 may correspond to the processor 120 described with reference to FIG. 2, and the communication unit 1150 may correspond to the communication interface 110 described with reference to FIG. 2. Therefore, descriptions of the memory 1140, the communication unit 1150, and the processor 1180, which are the same as the descriptions of the memory 130, the communication interface 110, and the processor 120 of FIG. 2 will be omitted.

The sensor 1110 may include various types of sensors, and, for example, the sensor 1110 may include various types of sensors such as an image sensor, an infrared sensor, an ultrasonic sensor, a lidar sensor, a human body detection sensor, a motion detection sensor, a proximity sensor, an illumination sensor, etc. Functions of the sensors may be intuitively inferred by those of skill in the art from their names, and thus detailed descriptions thereof will be omitted.

The output interface 1120 may include a display 1122 and an audio output unit 1124. The audio output unit 1124 may be implemented as, for example, a speaker. The output interface 1120 outputs various notifications, messages, information, and the like generated by the processor 1180.

The input interface 1130 may include a key 1132 and a touch screen 1134. The input interface 1130 receives a user input and transmits the user input to the processor 1180.

The memory 1140 stores various information, data, instructions, programs, and the like necessary for the operation of the home appliance 1100. The memory 1140 may include at least one of a volatile memory or a non-volatile memory, or a combination thereof. The memory 1140 may include at least one of a flash memory-type storage medium, a hard disk-type storage medium, a multimedia card microtype storage medium, a card-type memory (e.g., an SD or XD memory), RAM, SRAM, ROM, EEPROM, PROM, a magnetic memory, a magnetic disc, or an optical disc. Also, the home appliance 1100 may operate a web storage or a cloud server that performs a storage function on the Internet.

The communication unit 1150 may include at least one of a short-range wireless communication module 1152 and a long-range communication module 1154, or a combination thereof. The communication unit 1150 may include at least one antenna for wirelessly communicating with other devices.

The short-range wireless communication module 1152 may include, but is not limited to, a Bluetooth communication module, a BLE communication module, an NFC module, a WLAN (Wi-Fi) communication module, a Zigbee communication module, an Infrared Data Association (IrDA) communication module, a WFD communication module, an ultra-wideband (UWB) communication module, an Ant+ communication module, a microwave (uWave) communication module, and the like.

The long-range communication module 1154 may include a communication module for performing various types of long-range communication, and may include a mobile communication unit. The mobile communication unit transmits and receives wireless signals to and from at least one of a base station, an external terminal, or a server, on a mobile communication network. Here, the wireless signals may include various types of data based on transmission and reception of voice call signals, video call signals, or text/multimedia messages.

The home appliance function module 1160 includes an operation module that performs an original function of the home appliance 1100. FIG. 11 illustrates that the home appliance function module 1160 includes a washing module, a refrigerating/freezing module, a drying module, and a cleaning module, however, the disclosure is not limited thereto. In an embodiment of the disclosure, the home appliance function module 1160 may include a module specialized for a function of a certain home appliance. For example, when the home appliance 1100 is a washing machine, the home appliance function module 1160 includes the washing module. The washing module may include a washing tub, a water supply unit, a drainage unit, a motor, a door, a detergent inlet, and the like. As another example, when the home appliance 1100 is a refrigerator, the home appliance function module 1160 may include the refrigerating/freezing module. The refrigerating/freezing module may include a container, a cooler, a door, a temperature sensor, and the like. For example, when the home appliance 1100 is a dryer, the home appliance function module 1160 may include the drying module. The drying module may include a laundry container, a motor, a dehumidifier, a drainage unit, a door, a dust filter, a condenser, and the like. For example, when the home appliance 1100 corresponds to a vacuum cleaner, the home appliance function module 1160 may include the cleaning module. The cleaning module may include a vacuum suction unit, a dust container, a filter, a dust transfer pipe, and the like.

The processor 1180 controls the overall operation of the home appliance 1100. The processor 1180 may execute a program stored in the memory 1140 to control the components of the home appliance 1100.

According to an embodiment of the disclosure, the processor 1180 may include a separate neural processing unit (NPU) that performs the operation of a machine learning model. In addition, the processor 1180 may include a CPU, a graphics processing unit (GPU), and the like.

Figure 12:
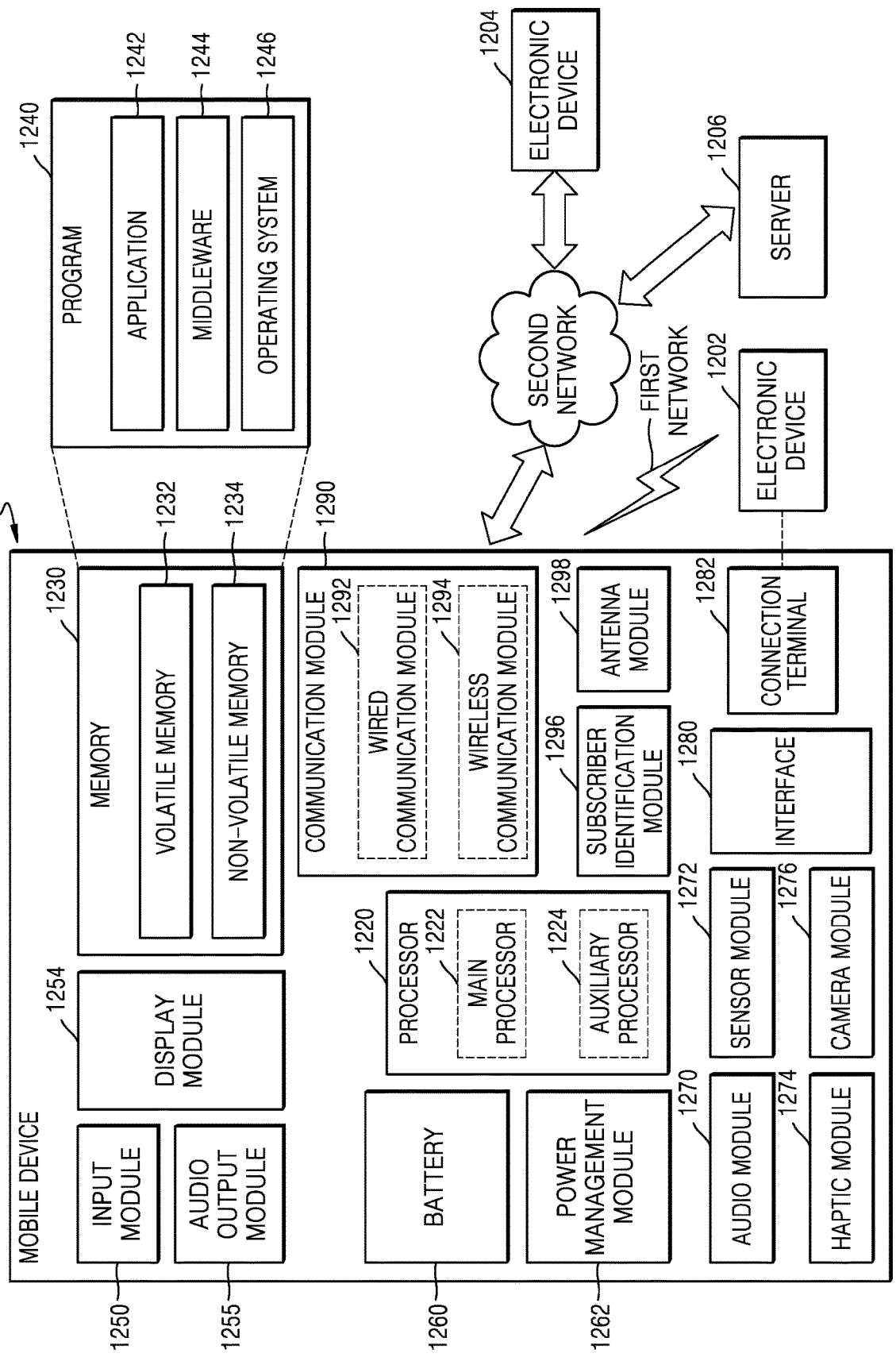
FIG. 12 is a block diagram illustrating components of a mobile device in a network environment, according to various embodiments of the disclosure.

FIG. 12 is a block diagram illustrating components of a mobile device 1200 in a network environment, according to various embodiments of the disclosure.

The mobile device 1200 of FIG. 12 may correspond to the mobile device 200 described above. The processor 240 of the mobile device 200 described with reference to FIG. 4 may correspond to a processor 1220 of FIG. 12, and the communication interface 210 described with reference to FIG. 4 may correspond to a communication module 1290 of FIG. 12. Also, the memory 250 described in FIG. 4 may correspond to a memory 1230 illustrated in FIG. 12. In addition, the home appliance 100 described with reference to FIGS. 1, 2, and 5 through 10 may correspond to an electronic device 1202 or an electronic device 1204 illustrated in FIG. 12.

Referring to FIG. 12, in the network environment, the mobile device 1200 may communicate with the electronic device 1202 through a first network (e.g., a short-range wireless communication network), or may communicate with at least one of the electronic device 1204 or a server 1206 through a second network (e.g., a long-range wireless communication network). According to an embodiment of the disclosure, the mobile device 1200 may communicate with the electronic device 1204 through the server 1206. According to an embodiment of the disclosure, the mobile device 1200 may include the processor 1220, the memory 1230, an input module 1250, an audio output module 1255, a display module 1254, a battery 1260, a power management module 1262, an audio module 1270, a sensor module 1272, a haptic module 1274, a camera module 1276, an interface 1280, a connection terminal 1282, the communication module 1290, a subscriber identification module 1296, or an antenna module 1298. In some embodiments of the disclosure, at least one of these components (e.g., the connection terminal 1282) may be omitted from the mobile device 1200 or one or more other components may be added to the mobile device 1200. In some embodiments of the disclosure, some of these components (e.g., the sensor module 1272, the camera module 1276, or the antenna module 1298) may be integrated into one component (e.g., the display module 1254).

The processor 1220 may execute, for example, software (e.g., a program 1240) to control at least one other component (e.g., a hardware or software component) of the mobile device 1200 connected to the processor 1220, and may perform various data processing or computation. According to an embodiment of the disclosure, as at least part of the data processing or computation, the processor 1220 may store a command or data received from another component (e.g., the sensor module 1272 or the communication module 1290) in a volatile memory 1232, process the command or the data stored in the volatile memory 1232, and store resulting data in a non-volatile memory 1234. According to an embodiment of the disclosure, the processor 1220 may include a main processor 1222 (e.g., a CPU or an AP) or an auxiliary processor 1224 (e.g., a GPU, an NPU, an image signal processor, a sensor hub processor, or a communication processor) that is operable independently from, or in conjunction with the main processor 1222. For example, when the mobile device 1200 includes the main processor 1222 and the auxiliary processor 1224, the auxiliary processor 1224 may be configured to consume less power than the main processor 1222, or to be specialized for a specified function. The auxiliary processor 1224 may be implemented separately from, or as part of the main processor 1222.

The auxiliary processor 1224 may, for example, control at least some of functions or states related to at least one component (e.g., the display module 1254, the sensor module 1272, or the communication module 1290) among the components of the mobile device 1200, on behalf of the main processor 1222 while the main processor 1222 is in an inactive (e.g., sleep) state, or together with the main processor 1222 while the main processor 1222 is in an active (e.g., executing an application) state. According to an embodiment of the disclosure, the auxiliary processor 1224 (e.g., an image signal processor or a communication processor) may be implemented as part of another functionally relevant component (e.g., the camera module 1276 or the communication module 1290). According to an embodiment of the disclosure, the auxiliary processor 1224 (e.g., a neural network processing device) may include a hardware structure specialized for processing of an artificial intelligence model. The artificial intelligence model may be generated through machine learning. Such learning may be performed, for example, by the mobile device 1200 in which the artificial intelligence model is performed, or may be performed through a separate server (e.g., the server 1206). Learning algorithms may include, for example, supervised learning, unsupervised learning, semi-supervised learning, or reinforcement learning, but are not limited thereto. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of thereof, but is not limited thereto. The artificial intelligence model may additionally or alternatively include a software structure in addition to the hardware structure.

The memory 1230 may store various data used by at least one component (e.g., the processor 1220 or the sensor module 1272) of the mobile device 1200. The data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an application 1242, middleware 1244, or an operating system 1246.

The input module 1250 may receive, from the outside (e.g., the user) of the mobile device 1200, a command or data to be used by a component (e.g., the processor 1220) of the mobile device 1200. The input module 1250 may include, for example, a microphone, a mouse, a keyboard, a key (e.g., a button), or a digital pen (e.g., a stylus pen).

The audio output module 1255 may output an audio signal to the outside of the mobile device 1200. The audio output module 1255 may include, for example, a speaker or a receiver. The speaker may be used for general purposes, such as reproducing multimedia or record. The receiver may be used to receive an incoming call. According to an embodiment of the disclosure, the receiver may be implemented separately from, or as part of the speaker.

The display module 1254 may visually provide information to the outside (e.g., the user) of the mobile device 1200. The display module 1254 may include, for example, a display, a hologram device, or a projector, and a control circuit for controlling a corresponding device. According to an embodiment of the disclosure, the display module 1254 may include a touch sensor configured to detect a touch, or a pressure sensor configured to measure the intensity of force generated by the touch.

The battery 1260 may supply power to at least one component of the mobile device 1200. According to an embodiment of the disclosure, the battery 1260 may include, for example, a non-rechargeable primary cell, a rechargeable secondary cell, or a fuel cell.

The power management module 1262 may manage power supplied to the mobile device 1200. According to an embodiment of the disclosure, the power management module 1262 may be implemented, for example, as at least part of a power management integrated circuit (PMIC).

The audio module 1270 may convert a sound into an electrical signal, or may convert an electrical signal into a sound. According to an embodiment of the disclosure, the audio module 1270 may obtain the sound through the input module 1250 or may output the sound through the audio output module 1255 or an external electronic device (e.g., the electronic device 1202) (e.g., a speaker or a headphone) directly or wirelessly connected to the mobile device 1200.

The sensor module 1272 may detect an operational state (e.g., power or temperature) of the mobile device 1200 or an external environmental state (e.g., a user state), and generate an electrical signal or a data value corresponding to the detected state. According to an embodiment of the disclosure, the sensor module 1272 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The haptic module 1274 may convert an electrical signal into a mechanical stimulus (e.g., vibration or movement) or an electrical stimulus which may be recognized by a user through his/her tactile or motion sensation. According to an embodiment of the disclosure, the haptic module 1274 may include, for example, a motor, a piezoelectric element, or an electrical stimulation device.

The camera module 1276 may capture a still image and a moving image. According to an embodiment of the disclosure, the camera module 1276 may include one or more lenses, image sensors, image signal processors, or flashes.

The interface 1280 may support one or more specified protocols that may be used for the mobile device 1200 to be connected to an external electronic device (e.g., the electronic device 1202) directly or wirelessly. According to an embodiment of the disclosure, the interface 1280 may include, for example, a high-definition multimedia interface (HDMI), a universal serial bus (USB) interface, a secure digital (SD) card interface, or an audio interface.

The connection terminal 1282 may include a connector through which the mobile device 1200 may be physically connected with an external electronic device (e.g., the electronic device 1202). According to an embodiment of the disclosure, the connection terminal 1282 may include, for example, an HDMI connector, a USB connector, an SD card connector, or an audio connector (e.g., a headphone connector).

The communication module 1290 may support establishment of a direct (e.g., wired) communication channel or a wireless communication channel between the mobile device 1200 and an external electronic device (e.g., the electronic device 1202, the electronic device 1204, or the server 1206) and performing of communication through the established communication channel. The communication module 1290 may include one or more communication processors that are operable independently from the processor 1220 (e.g., an AP) and support direct (e.g., wired) communication or wireless communication. According to an embodiment of the disclosure, the communication module 1290 may include a wireless communication module 1292 (e.g., a cellular communication module, a short-range wireless communication module, or a GNSS communication module) or a wired communication module 1294 (e.g., a LAN communication module, or a power line communication module). A corresponding communication module of these communication modules may communicate with the external electronic device 1204 through the first network (e.g., a short-range communication network such as Bluetooth, Wi-Fi Direct, or IrDA) or the second network (e.g., a long-range communication network such as a legacy cellular network, a 5G network, a next-generation communication network, the Internet, or a computer network (e.g., a LAN or wide area network (WAN)). These various types of communication modules may be integrated into one component (e.g., a single chip) or may be implemented as a plurality of components (e.g., a plurality of chips) that are separate from each other. The wireless communication module 1292 may use subscriber information (e.g., international mobile subscriber identity (IMSI)) stored in the subscriber identification module 1296 to identify or authenticate the mobile device 1200 in a communication network, such as the first network or the second network.

The wireless communication module 1292 may support 5G network and next-generation communication technology after 4G network, for example, new radio (NR) access technology. The NR access technology may support high-speed transmission of high-capacity data (enhanced mobile broadband (eMBB)), terminal power minimization and multiple terminal accesses (massive machine-type communications (mMTC)), or ultra-reliable low latency communications (URLLC). The wireless communication module 1292 may support a high-frequency band (e.g., a mmWave band), for example, to achieve a high data transmission rate. The wireless communication module 1292 may support various techniques for securing performance in a high-frequency band, for example, beamforming, massive multiple-input and multiple-output (MIMO), full dimensional MIMO (FD-MIMO), array antenna, analog beamforming, or large-scale antenna. The wireless communication module 1292 may support various requirements specified in the mobile device 1200, an external electronic device (e.g., the electronic device 1204), or a network system (e.g., the second network). According to an embodiment of the disclosure, the wireless communication module 1292 may support a peak data rate (e.g., 20 Gbps or greater) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1298 may transmit or receive a signal or power to or from the outside (e.g., an external electronic device). According to an embodiment of the disclosure, the antenna module 1298 may include an antenna including a radiator including a conductive material or a conductive pattern formed on a substrate (e.g., a printed circuit board (PCB)). According to an embodiment of the disclosure, the antenna module 2297 may include a plurality of antennas (e.g., an array antenna). In this case, at least one antenna suitable for a communication scheme used in a communication network such as the first network or the second network may be selected from the plurality of antennas by, for example, the communication module 1290. The signal or the power may be transmitted or received between the communication module 1290 and an external electronic device through the selected at least one antenna. According to some embodiments of the disclosure, a component (e.g., a radio frequency integrated circuit (RFIC)) other than the radiator may be additionally formed as part of the antenna module 1298.

According to various embodiments of the disclosure, the antenna module 1298 may form a mmWave antenna module. According to an embodiment of the disclosure, the mmWave antenna module may include a PCB, a RFIC arranged on a first surface (e.g., the bottom surface) of the PCB, or adjacent to the first surface and capable of supporting a specified high-frequency band (e.g., a mmWave band), and a plurality of antennas (e.g., an array antenna) arranged on a second surface (e.g., the top or a side surface) of the PCB, or adjacent to the second surface and capable of transmitting or receiving signals of the specified high-frequency band.

At least some of the components may be connected to each other through a communication scheme (e.g., a bus, general-purpose input and output (GPIO), a serial peripheral interface (SPI), or a mobile industry processor interface (MIPI)) between peripheral devices, and exchange signals (e.g., commands or data) with each other.

According to an embodiment of the disclosure, commands or data may be transmitted or received between the mobile device 1200 and the external electronic device 1204 through the server 1206 connected to the second network. Each of the external electronic devices 1202 and 1204 may be of the same type as, or a different type from the mobile device 1200. According to an embodiment of the disclosure, all or some of the operations executed in the mobile device 1200 may be executed in one or more external electronic devices among the external electronic devices 1202 and 1204, or the server 1206. For example, when the mobile device 1200 needs to perform some functions or services automatically, or in response to a request from the user or another device, the mobile device 1200 may request one or more external electronic devices to perform at least part of the functions or services, instead of, or in addition to executing the functions or services by itself. The one or more external electronic devices having received the request may execute the at least part of the requested functions or services or an additional function or service related to the request, and transmit a result of the execution to the mobile device 1200. The mobile device 1200 may provide the result, with or without further processing of the result, as at least part of a response to the request. To this end, for example, cloud computing, distributed computing, mobile edge computing (MEC), or client-server computing technology may be used. The mobile device 1200 may provide an ultra-low latency service by using, for example, distributed computing or MEC. In another embodiment of the disclosure, the external electronic device 1204 may include an Internet-of-Things (IoT) device. The server 1206 may be an intelligent server using machine learning and/or a neural network. According to an embodiment of the disclosure, the external electronic device 1204 or the server 1206 may be included in the second network. The mobile device 1200 may be applied to intelligent services (e.g., smart homes, smart cities, smart cars, or health care) based on 5G communication technologies and IoT-related technologies.

The term "module" used in various embodiments of the disclosure may include a unit implemented in hardware, software, or firmware, and may be used interchangeably with terms such as "logic", "logic block", "part", or "circuitry". A module may be a single integral component, or a minimum unit or part thereof, adapted to perform one or more functions. For example, according to an embodiment of the disclosure, a module may be implemented in the form of an ASIC.

Various embodiments of the disclosure may be implemented as software (e.g., a program) including one or more instructions stored in a storage medium readable by a machine (e.g., the home appliance 100, the mobile device 200). For example, a processor of the machine (e.g., the home appliance 100 or the mobile device 200) may invoke at least one instruction of the stored one or more instructions from the storage medium and execute it. This enables the device to be operated to perform at least one function according to the invoked at least one instruction. The one or more instructions may include code generated by a compiler or code executable by an interpreter.

The machine-readable storage medium may be provided in the form of a non-transitory storage medium. Here, the term 'non-transitory' merely means that the storage medium is a tangible device and does not include a signal (e.g., an electromagnetic wave), and this term does not distinguish whether data is stored in the storage medium semi-permanently or temporarily.

According to an embodiment of the disclosure, a method according to various embodiments disclosed in the disclosure may be included and provided in a computer program product. The computer program product may be traded as a product between a seller and a buyer. The computer program product may be distributed in the form of a machine-readable storage medium (e.g., compact disc-ROM (CD-ROM)), or be distributed (e.g., downloaded or uploaded) online through an application store (e.g., PlayStore™), or between two user devices (e.g., smart phones) directly. In the case of online distribution, at least part of the computer program product may be temporarily stored, or temporarily generated, on a storage medium such as a manufacturer's server, a server of an application store, or a memory of a relay server.

According to various embodiments of the disclosure, each component (e.g., a module or a program) of the above-described components may include a single or a plurality of entities, and some of the plurality of entities may be separately arranged in another component. According to various embodiments of the disclosure, one or more components or operations of the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components in the same or similar manner as those performed by a corresponding component of the plurality of components before the integration. According to various embodiments of the disclosure, operations performed by a module, a program, or another component may be sequentially, in parallel, repetitively, or heuristically executed, one or more of the operations may be executed in a different order, omitted, or one or more other operations may be added.

What is claimed is:

1. A method comprising:

by a home appliance, obtaining access point information and information of a set-up cloud server, from a mobile device connected to the home appliance through device-to-device communication;

transmitting a temporary password to the mobile device through the device-to-device communication;

establishing a communication connection with the set-up cloud server by using the obtained access point information and the obtained information of the set-up cloud server;

obtaining user account information from the set-up cloud server by using the temporary password as an identification key; and registering the home appliance in an Internet-of-Things (IoT) server by providing information of the home appliance and the obtained user account information to the IoT server.

2. The method of claim 1, wherein the user account information is obtained from the set-up cloud server based on a mapping of the user account information with the temporary password in a key-value format in the set-up cloud server.

3. The method of claim 1, wherein the obtaining of the user account information comprises:

transmitting, to the set-up cloud server through the communication connection with the set-up cloud server, the temporary password and a query signal for requesting the user account information, and obtaining, from the set-up cloud server, the user account information based on a mapping of the user account information with the temporary password in a key-value format in the set-up cloud server.

4. The method of claim 1, further comprising:

by the home appliance, receiving, from the mobile device, a user authentication process request signal for requesting an authentication process with respect to ownership of the home appliance;

in response to the received user authentication process request signal, receiving an authentication input from a user; and transmitting information about the authentication input to the mobile device.

5. The method of claim 4, wherein, in the transmitting of the temporary password, the temporary password is transmitted to the mobile device according to a result of a user authentication by the mobile device based on the transmitted information about the authentication input.

6. The method of claim 1, wherein the registering of the home appliance comprises:

establishing a communication connection with the IoT server by using the server connection information, signing in to the IoT server by using the user account information, and registering the home appliance with the user account by transmitting at least one of device identification information, a device type, resource information, or profile information of the home appliance.

7. A home appliance comprising:

a communication interface configured to perform data communication with a server or a mobile device;

a memory storing at least one instruction; and at least one processor configured to execute the at least one instruction stored in the memory to:
  obtain access point information and information of a set-up cloud server from the mobile device connected to the home appliance through device-to-device communication, by using the communication interface,
  generate a temporary password comprising a random number,
  transmit the temporary password to the mobile device by using the communication interface,
  establish a communication connection with the set-up cloud server by using the obtained access point information and the obtained information of the set-up cloud server,
  obtain user account information from the set-up cloud server by using the temporary password as an identification key, and
  perform device registration in an Internet-of-Things (IoT) server by providing information of the home appliance and the obtained user account information to the IoT server.

8. The home appliance of claim 7, wherein the user account information comprises a user identifier (ID) and a password.

9. The home appliance of claim 7, wherein
the user account information is obtained from the set-up cloud server based on a mapping of the user account information with the temporary password in a key-value format in the set-up cloud server.

10. The home appliance of claim 9, wherein the at least one processor is further configured to execute the at least one instruction to:
  control the communication interface to transmit, to the set-up cloud server, the temporary password and a query signal for requesting the user account information, and
  obtain the user account information based on a mapping of the user account information with the temporary password in a key-value format in the set-up cloud server.

11. The home appliance of claim 7, further comprising:
a user input unit,
wherein the at least one processor is further configured to execute the at least one instruction to:
  receive, from the mobile device through the communication interface, a user authentication process request signal for requesting an authentication process with respect to ownership of the home appliance,
  receive an authentication input from a user through the user input unit in response to the received user authentication process request signal, and
  control the communication interface to transmit, to the mobile device, information about the authentication input.

12. The home appliance of claim 11, wherein the at least one processor is further configured to execute the at least one instruction to:
  control the communication interface to transmit the temporary password to the mobile device according to a result of a user authentication by the mobile device based on the transmitted information about the authentication input.

13. The home appliance of claim 7, wherein the at least one processor is further configured to execute the at least one instruction to:
  control the communication interface to obtain, from the set-up cloud server, server connection information comprising at least one of an internet protocol (IP) address of the IoT server, an access token of the IoT server, a location ID of the home appliance, a room ID, a nickname, and an access point name (APN).

14. The home appliance of claim 13, wherein the at least one processor is further configured to execute the at least one instruction to:
  establish a communication connection with the IoT server by using the server connection information,
  sign in to the IoT server by using the user account information,
  control the communication interface to transmit at least one of device identification information, a device type, resource information, or profile information of the home appliance, and
  register the home appliance in the IoT server in association with the user account information.

15. A computer program product comprising a non-transitory computer-readable storage medium having recorded thereon instructions executable by a home appliance for performing:
  by the home appliance,
  obtaining access point information and information of a set-up cloud server from a mobile device connected to the home appliance through device-to-device communication;
  transmitting a temporary password to the mobile device through the device-to-device communication;
  establishing a communication connection with the set-up cloud server by using the obtained access point information and the obtained information of the set-up cloud server;
  obtaining user account information from the set-up cloud server by using the temporary password as an identification key; and
  registering the home appliance in an Internet-of-Things (IoT) server by providing information of the home appliance and the obtained user account information to the IoT server.

* * * * *